(12) United States Patent
Liu et al.

(10) Patent No.: US 11,057,076 B2
(45) Date of Patent: Jul. 6, 2021

(54) SELECTIVE APPLICATION OF ERROR DETECTION AND CORRECTION FOR RADIO FREQUENCY IDENTIFICATION

(71) Applicant: Ruizhang Technology Limited Company, Shanghai (CN)

(72) Inventors: Chang-Chi Liu, Fremont, CA (US); Steve Wang, San Jose, CA (US)

(73) Assignee: RUIZHANG TECHNOLOGY LIMITED COMPANY, Shanghai (CN)

( * ) Notice: Subject to any disclaimer, the term of this patent is extended or adjusted under 35 U.S.C. 154(b) by 628 days.

(21) Appl. No.: 14/845,238

(22) Filed: Sep. 3, 2015

(65) Prior Publication Data
US 2017/0063490 A1      Mar. 2, 2017

(30) Foreign Application Priority Data
Aug. 24, 2015   (CN) .......................... 201510523770.9

(51) Int. Cl.
*H04B 5/00*   (2006.01)
*G06K 7/10*   (2006.01)
(Continued)

(52) U.S. Cl.
CPC ........... *H04B 5/0031* (2013.01); *G06F 11/00* (2013.01); *G06F 11/1048* (2013.01);
(Continued)

(58) Field of Classification Search
CPC ........................... H04L 1/0041; H04B 5/0031
See application file for complete search history.

(56) References Cited

U.S. PATENT DOCUMENTS 8,774,710 B2 *   7/2014   Kawaguchi .......... G06K 7/0008
                                                                    375/324
8,977,422 B1    3/2015   Westfall
(Continued)

FOREIGN PATENT DOCUMENTS

CN    101981561 A    2/2011
CN    102576418 A    7/2012

OTHER PUBLICATIONS

European Search Report for European Application No. 16001860.2, dated Jan. 20, 2017, 7 pages.
(Continued)

*Primary Examiner* — April Y Blair
*Assistant Examiner* — Rong Tang
(74) *Attorney, Agent, or Firm* — Womble Bond Dickinson (US) LLP

(57) ABSTRACT

Methods, apparatuses, and system for performing at least one of error correction or error detection are described. In one embodiment, a radio frequency identification (RFID) tag receives a signal activating or interrogating the tag. The tag includes memory that stores data associated with the tag. The tag performs at least one of error detection or error correction on the stored data. The error detection includes detecting, by the tag, that one or more bits of the stored data are inflicted with an error. The error correction includes correcting the erroneous bit if the error affects less than a predetermined number of the bits of the stored data. The tag transmits the stored data to a reader in response to the detection or correction. The reader can analyze the stored data for additional information about the error or provide the stored data to another computing system that performs the analysis.

29 Claims, 8 Drawing Sheets

(51) Int. Cl.
*G06F 11/00* (2006.01)
*G06K 19/07* (2006.01)
*G06F 11/10* (2006.01)

(52) U.S. Cl.
CPC ...... *G06K 7/10118* (2013.01); *G06K 19/0723* (2013.01); *H04B 5/0062* (2013.01)

(56) References Cited

U.S. PATENT DOCUMENTS

| | | |
|---|---|---|
| 2003/0001574 A1 | 1/2003 | Kroeckel et al. |
| 2007/0063029 A1* | 3/2007 | Brandt ................... G06Q 10/08 235/385 |
| 2007/0229227 A1 | 10/2007 | Brown |
| 2009/0033493 A1 | 2/2009 | Lin et al. |
| 2011/0037568 A1* | 2/2011 | Kim ..................... G06K 7/0008 340/10.1 |
| 2012/0278676 A1* | 11/2012 | Teraura ............... G06F 11/1489 714/746 |

OTHER PUBLICATIONS

EPCT™ A Radio-Frequency Identity Protocols Generation-2 UHF RFID, Protocol for Communication at 860 MHz to 960 V1Hz, Version 2.0.1, EPCglobal, Inc.; Apr. 2015, 152 pages.
First Office Action for Chinese Patent Application No. 201510523770. 9, dated Oct. 28, 2018, 25 pages.

* cited by examiner

SELECTIVE APPLICATION OF ERROR DETECTION AND CORRECTION FOR RADIO FREQUENCY IDENTIFICATION

This application claims priority under 35 U.S.C. § 119 to Chinese Patent Application No. 201510523770.9 filed on Aug. 24, 2015.

FIELD

Embodiments described herein relate generally to radio frequency identification (RFID) devices and systems, and more specifically to error-detection and error-correction techniques for RFID devices and systems.

BACKGROUND INFORMATION

Goods and other items may be tracked and identified using a radio frequency identification (RFID) system. An RFID system usually includes at least two types of RFID devices—a tag and a reader. The tag is a transponder typically placed on an object to be tracked. The tag usually includes an antenna and an integrated circuit (IC). The tag can also include memory for data storage. The reader, sometimes referred to as an interrogator, includes a transceiver (or alternatively, a separate transmitter and a separate receiver) and one or more antennas. The antennas emit electromagnetic (EM) waves generated by the transceiver, which, when received by tag, activates the tag. Once the tag activates, it communicates using radio waves back to the reader, thereby identifying the object to which it is attached. RFID systems have been used in retail, warehouse, and manufacturing industries to track large numbers of items being processed, inventoried, or handled within these industries.

There are three basic types of tags. A beam-powered tag, commonly referred to as a passive tag, is a passive device that receives energy required for operation from EM waves generated by the reader. The beam powered tag rectifies an EM field and creates a change in reflectivity of the field which is reflected to and read by the reader. This is commonly referred to as continuous wave backscattering. A battery-powered semi-passive tag also receives and reflects EM waves from the reader; however a battery powers the tag independent of receiving power from the reader. An active tag, having an independent power supply, actively transmits EM waves that are then received by the reader.

Tags can be manufactured with ICs that include memory for storing data (e.g., serial number, model number, and other characteristics). The memory of the tag can include at least one of non-volatile or persistent memory. A reader can initialize a tag's memory based on individual application requirements. For example, a unique identification code can be encoded in the memory of the tag by the manufacturer of a given product immediately before a tag's application to the product or its packaging. In other situations, more data can be programmed into a tag's memory. For example, a retail company can include additional data in the tag's memory to provide specific details about the tagged item—for example, make of the item, color of the item, price of item, etc.

In principle, RFID systems operate, in part, by using a reader to interrogate one or more RFID tags. In such systems, particularly large-scale RFID systems used in the retail, supply chain, or manufacturing industries, RFID readers should accurately return information that is read from the tags. Generally, a tag read rate of approximately 100% is required. Otherwise, the RFID system will collect incomplete data that can cause damages to and create deficiencies in the operations of these industries. One cause of suboptimal read rates results from data corruption and bit-flips in the memory of the tags, where information is stored.

Data corruption and bit-flips in the memory of tags can be traced to many causes, including design and manufacture processes variations. As explained earlier, passive and semi-passive tags activate themselves by harvesting energy from readers. The harvesting of energy can affect the tags' memory.

One solution that has been used to address data corruption and bit-flips is an error detection code scheme. A well-known example is a cycling redundancy check (CRC). Error detection is implemented in RFID devices and systems by calculating CRC checksums over data stored in a single tag's memory, and the results of the calculations are used for detecting errors resulting from faulty data storage or transmission.

Despite the use of error detection code schemes, the prevention and rectification of data corruption or bit-flips in the memory of RFID devices is suboptimal.

SUMMARY OF THE DESCRIPTION

Methods, apparatuses, and system for performing at least one of error correction or error detection are described.

In one embodiment, a radio frequency identification (RFID) tag receives a signal activating or interrogating the tag. In one embodiment, the tag includes memory that stores data. The tag's stored data can include user data (which is programmable by a user) and manufacturing data (which is generally programmed by the tag's manufacturer and cannot be programmed by the user). In one embodiment, the manufacturing data associated with the tag and is unique to that specific tag. In one embodiment, the tag performs at least one of error detection or error correction on the stored data. In one embodiment, the error detection includes detecting, by the tag, that one or more bits of the stored data are inflicted with an error. In one embodiment, the error correction includes correcting the erroneous bit if the error affects less than a predetermined number of the bits of the stored data. In one embodiment, the tag transmits the stored data to a reader in response to the detection or correction. In one embodiment the stored data that is transmitted by the tag includes at least one of the corrected stored data, the corrupted stored data, or the manufacturing data associated with the tag. In one embodiment, the reader analyzes the manufacturing data to determine whether the error was caused by a manufacturing defect. In one embodiment, when the error is attributable to a manufacturing defect, the reader analyzes the manufacturing data to determine at least one of a source of the manufacturing defect or a location of the manufacturing defect. In one embodiment, the reader provides the manufacturing data to another computing system that performs the analysis and the determination of the source or location of the manufacturing defect. In one embodiment, the other computing system is associated with a manufacturer or a designer of the tag.

Other advantages and features will become apparent from the accompanying drawings and from the following detailed description.

BRIEF DESCRIPTION OF THE DRAWINGS

Embodiments described herein are illustrated by way of example and not limitation in the figures of the accompanying drawings, in which like references indicate similar elements. Furthermore, in the figures, some conventional details have been omitted so as not to obscure from the embodiments described herein.

In FIG. 2, the components of the reader and the tags illustrated in FIG. 1 are described in more detail;

DETAILED DESCRIPTION

Figure 1:
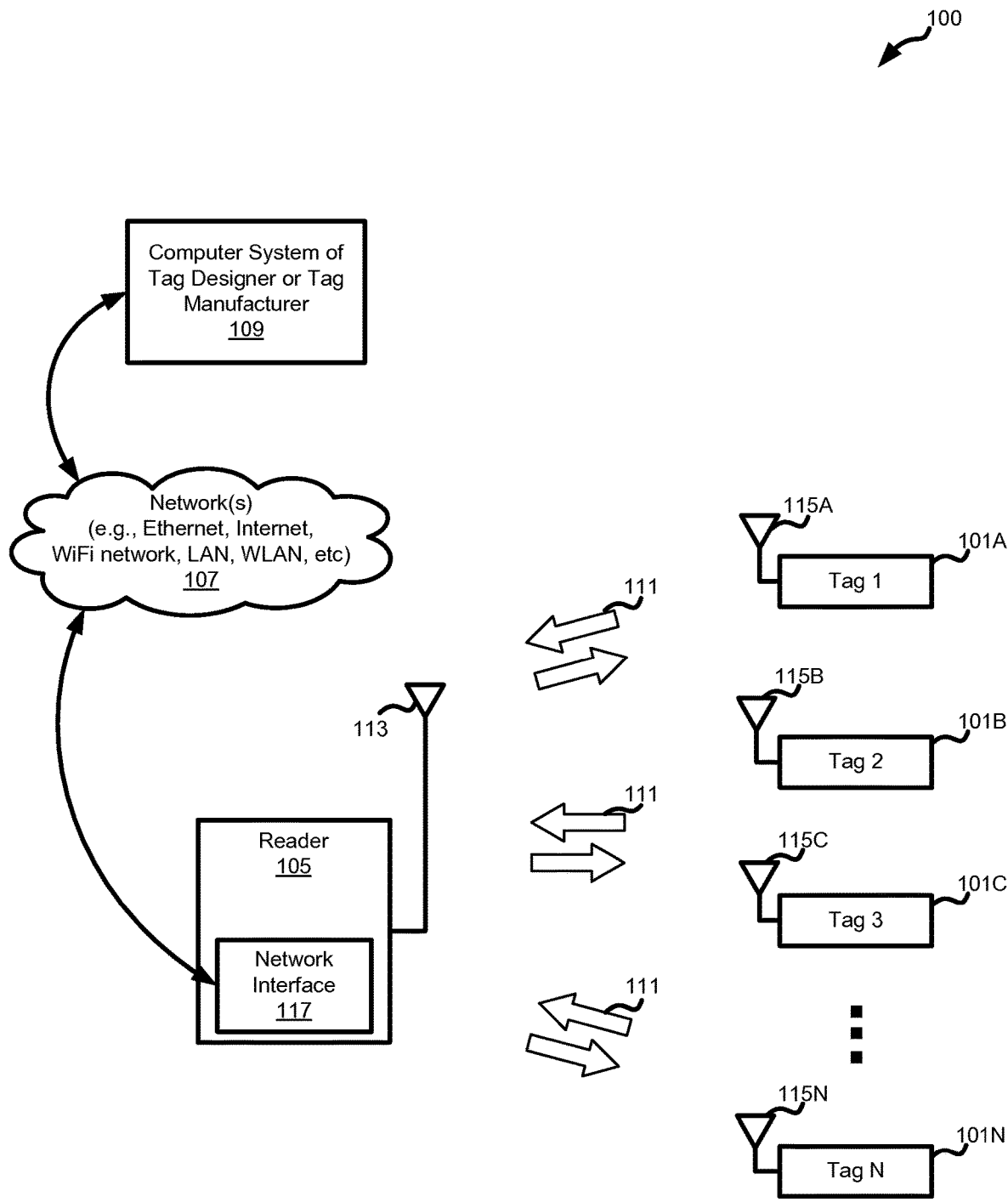
FIG. 1 is a block diagram illustrating one embodiment of a radio frequency identification (RFID) system that includes a reader and a plurality of tags configured to perform at least one of error detection or error correction in accordance with at least one of the embodiments described herein.

Methods and apparatuses for at least one of error correction or error detection in radio frequency identification (RFID) systems are described herein.

The following description and drawings are illustrative of the embodiments described herein and are not to be construed as limiting. Numerous specific details are described to provide a thorough understanding of the inventive concepts set forth in the embodiments described herein. However, in certain instances, well known or conventional details are not described in order to avoid obscuring the description of the inventive concepts set forth in the embodiments described herein. References to "one embodiment," "an embodiment," "another embodiment," "yet another embodiment," or their respective variations in the present disclosure are not necessarily references to the same embodiment; and, such references mean at least one.

The processes depicted in the figures that follow, are performed by processing logic that comprises hardware (e.g., circuitry, dedicated logic, etc.), software (such as is run on a general-purpose computer system or a dedicated machine), or a combination of both. Although the processes may be described below in terms of some sequential operations, it should be appreciated that some or all of the operations described may be performed in different order. Moreover, some or all of the operations may be performed in parallel rather than sequentially.

The terms "host," "device," "interrogator," "tag," "RFID system," and their respective variations are intended to refer generally to data processing systems rather than specifically to particular form factors.

As used herein, the term "bit-flip" and its variations refer to an unintentional state switch of one or more bits of a byte or a word stored in volatile or non-volatile memory. For example, a bit with a value of 0 unintentionally switches to a value of 1. As used herein, a "single bit-flip" and its variations refer to an unintentional state switch of only one bit of a byte or a word stored in volatile or non-volatile memory. As used herein, a "multiple bit-flip" and its variations refer to an unintentional state switch of at least two bits of a byte or a word stored in volatile or non-volatile memory.

According to one embodiment, an error correction method for use with a RFID tag comprised of an antenna and an integrated circuit (IC) includes receiving, via the antenna, a signal activating or interrogating the tag. In one embodiment, the IC of the tag includes memory that stores data associated with the tag. In one embodiment, the IC is configured to perform at least one of error detection or error correction on the data stored in the tag's IC. In one embodiment, the error detection includes detecting, by the IC of the tag, that one or more bits of the data stored in the tag's IC has an error. In one embodiment, the detection of the error is performed after the tag is activated. In one embodiment, the error correction includes transmitting the manufacturing data in response to the detection of the error.

In one embodiment of the error correction method described above, the tag's IC is further configured to correct any detected error. In one embodiment, the error is corrected only when less than a predetermined number of the bits of the data stored in the tag's IC have the error. In one embodiment, the data stored in the tag's IC is transmitted after the correction is performed. In one embodiment of the error correction method, the predetermined number is less than three and is small relative to a total number of the bits of the data stored in the tag's IC. In one embodiment of the error correction method, the predetermined number is less than two and is small relative to a total number of the bits of the data stored in the tag's IC. In one embodiment, the total number of bits is sixteen (16) bits. In one embodiment, the error is corrected only when the ratio of the predetermined number to total number of the bits is 1:16 or 2:16.

In one embodiment, the data stored in the tag's IC includes at least one of a tag identification (TID), which can also referred to as a TID number, transponder ID, or a transponder ID number. In one embodiment, the data includes at least one of a wafer number, a manufacturer of the tag, a wafer lot number, a manufacturing process of a wafer comprising a die of the IC, or a location of the die on the wafer. In one embodiment, the data includes at least one of a total number of errors detected for the tag, a total number of single bit-flips detected for the tag, a total number of multiple bit-flips detected for the tag, the corrupted data, a warning of the corrupted data, an indication that the corrupted data has been corrected, or the corrected data.

In one embodiment of the error detection method, the data stored in the tag's IC is transmitted to at least one of an RFID reader or an entity that designed or manufactured the tag. In one embodiment, the data stored in the tag's IC is transmitted to a computer system or other device used for receiving and processing data, where the computer system or the other device is associated with an entity that designed or manufactured the tag. In one embodiment, the data stored in the tag's IC is transmitted to the entity that designed or manufactured the tag over a network using a network interface.

The network interface can include at least one of a Wi-Fi transceiver, an Ethernet transceiver, a cellular telephone transceiver, or a wireless personal area transceiver.

In one embodiment of the error correction method, the IC of the tag includes an error counter configured to count each error that occurs with the bits of the data stored in the tag's IC. In one embodiment, a count having the total number of occurred errors is stored in the memory. In one embodiment, the count is continually updated. In one embodiment, a signal including the count is transmitted via the tag's antenna to a reader or to a computer system of an entity that designed or manufactured the tag's IC each time an error is detected and the count is updated.

In one embodiment of the error correction method, the memory of the tag's IC is a non-volatile memory. In one embodiment, the memory includes at least one of a reserved memory bank, an electronic product code (EPC™) memory bank, a tag identification (TID) memory bank, or a user memory bank.

Each of the embodiments of the error correction method set forth above can be implemented using an RFID system. Each of the embodiments of the error correction method set forth above can be implemented in an RFID system that is made up of at least one RFID tag, at least one RFID reader, or at least one apparatus that includes a processing device capable of executing computer-executable instructions. The computer-executable instructions may be stored in a memory of the processing device, it may be provided via a non-transitory computer-readable medium that is configured to cause to the processing device to perform at least one of the embodiment of the error correction method set forth above, it may be communicated through a wired or wireless connection to the processing device using an interface Error correcting code such as Hamming code, Reed Solomon code, and others have been widely used in a variety of error correction applications. CD and DVDs use an interval Reed Solomon code to correct errors caused by scratched surface. Many data transmission techniques, such as Digital subscriber line (DSL), Asynchronous Transfer Mode (ATM), and Worldwide Interoperability for Microwave Access (WiMAX), as well as digital broadcasting products such as digital video broadcasting and digital audio broadcasting use several of the Reed Solomon codes for forward error correction.

The embodiments described herein utilize at least one error correction technique or at least one error detection technique to facilitate error correction or detection for readers or tags of an RFID system. The embodiments described are applicable to several types of reader or tags including, but not limited to, Gen 2-type RFID tags.

Tags are comprised of an antenna and an integrated circuit (IC). The antenna is for transmitting and receiving signals and the IC is used for, among others, storing the tag's identification and other information. The IC can be a digital signal processor (DSP), an application-specific IC (ASIC), a radio-frequency ICs (RFICs), or any other type of microprocessor suitable for RFID applications. The IC can include non-volatile memory (e.g., flash memory, electrically erasable programmable read-only memory (EEPROM), etc.).

Data corruption and bit-flips in the non-volatile memory of the IC of tags can be caused during the design and manufacture of the ICs. Specifically, variations in the processes of designing or manufacturing IC can result in failure mechanisms that affect the performance of an IC used in a tag or a reader. Failure mechanisms can result from material-interaction-induced mechanisms (e.g., field-effect transistor gate-metal sinking, ohmic contact degradation, channel degradation, surface-state effects, package molding contamination, etc.); stress-induced mechanisms (e.g., electromigration, localized overstress, hot electron trapping, electrical overstress, electrostatic discharge, etc.); mechanically induced failure mechanisms (e.g., die fracture, die-attach voids, solder joint failure, molding compound contamination, etc.); or environmentally induced failure mechanisms (e.g., humidity effects, hydrogen effects, temperature effects, etc.). In an example, passive and semi-passive tags harvest energy from readers in a way that can negatively affect the tags' non-volatile memory components (e.g., transistors working as a sub-threshold level). In situations where IC of the tag includes a failure mechanism, the harvested energy could result in lower component voltage, which in turn results in a lower safety threshold being created for one or more bits in a tag's non-volatile memory. This decreased safety threshold can increase the likelihood of data corruption and bit-flips. In another example, the failure mechanism experienced by one or more components of the RFID system or the reader can cause the data corruption and bit-flips in the IC of the tags. In yet another example, the data corruption and bit-flips may results from the tag's IC, the tag's inlay design, or system's readers operating out of specification.

One cause of data corruption and bit-flips results from the failure mechanism of the tag's IC. Certain types of IC designs or manufacturing processes can either lessen the impact or visibility of the failure mechanisms of the tag's IC or can exacerbate these failure mechanisms. Thus, the designs and manufacturing processes used to create a tag's IC are a critical part of failure mechanisms that contribute to improper functioning of tags, readers, and RFID systems.

All ICs (also referred to as semiconductor devices or microprocessors) are subject to failure mechanisms. It is beyond the scope of the description provided herein to discuss IC failure mechanisms in detail. IC failure mechanisms can be found in the RFID industry because RFID devices can be manufactured using low cost, high volume manufacturing processes. It is important to note that the higher the volume of RFID devices that are manufactured, the higher the likelihood that one of the ICs in these RFID devices will experience a failure. This is because the failure rate is inherent to the processes used to design or manufacture ICs. For example, electromigration and other failure mechanisms are well documented inside and outside the RFID industry. Even with testing to estimate and predict the failure rate, the failure rates are still inherent to the design and manufacturing processes. Moreover, the use of low cost, high volume manufacturing can result in ICs that suffer from data corruption and bit-flips after fabrication. For example, during storage of a fabricated IC.

At least one of the many techniques used to estimate these failure rates includes an accelerated life testing process which relies on testing an IC at temperature/pressure extremes to "age" the silicon in the IC at a faster rate. This process is then followed by complex statistical analysis of the obtained data. Generally, an acceptable result within the semiconductor industry is a failure rate of about 300 parts per million (ppm). Other non-semiconductor factors (e.g. tag level issues) are not included in this number of 300 ppm and are often much higher. During the accelerated life testing process, some IC components will age faster than other "identical" IC components due to variation in the semiconductor process that is inherent to the design and manufacturing processes. These variations alone are enough to ascertain that the 300 ppm failure rate is merely a floor and may be exacerbated by environmental, physical conditions, improper handling, exposure to moisture, heat, radiation etc.

Examples of failure mechanism experienced by ICs include issues with the following: semiconductor substrate (PN junctions, alloy spikes); Si—SiO$_2$ interface (degradation due to hot carriers, noise charge due to impact ionization); gate oxide film (oxide film breakdown, electrical charges in oxide film); passivation (pinholes, cracks, polarization etc.); exceeding EEPROM write endurance; metallization (contact failure, corrosion, electromigration, stress migration); and others.

The embodiments described herein utilize at least one of error correction code or error detection code to facilitate error correction or detection for readers or tags of an RFID system. The embodiments described are applicable to several types of readers or tags including, but not limited to, Gen 2-type RFID tags.

FIG. 1 is a block diagram illustrating a radio frequency identification (RFID) system 100 that includes a reader 105 and a plurality of tags 101A-N configured to perform at least one of error detection or error correction in accordance with at least one of the embodiments described herein.

System 100 can be either a reader-talks-first or tag-talks-first system using passive, semi-passive, or active tags. In one embodiment, the reader 105 is a processing system that includes a receiver and a transmitter (alternatively, a transceiver) for receiving or transmitting signals 111 from or to each of tags 101A-N. In one embodiment, the reader 105 is coupled to at least one antenna 113. For example, and in one embodiment, the receiver may have its own antenna 113, and the transmitter may have its own antenna 113. It will be appreciated by those in the art that the receiver and the transmitter (alternatively, a transceiver) of reader 105 may share the same antenna 113 provided that there is a receive/transmit switch which controls the signal present on the antenna and which isolates the receiver and transmitter from each other.

In one embodiment, the reader 105 includes at least one IC (not shown) that is configured to decode received tag data with the appropriate tag-to-reader protocol scheme. The reader 105 may also include a network interface 117, such as an Ethernet interface, universal bus interface, or Wi-Fi interface (such as IEEE 802.11, 802.11a, 802.11b, 802.16a, Bluetooth, Proxim's OpenAir, HomeRF, HiperLAN and others), which allows the reader to communicate to other processing systems through a network 107, including without limitation an computer system 109 that is associated with a designer or manufacturer of at least one of the reader 105 or the tags 101A-N. In one embodiment, the network 107 is at least one of an Ethernet-based network, a Wi-Fi-based network, a Bluetooth-based network, or any other type of suitable network that enables transmission of data from the reader 105 to the computer system 109. In one embodiment, the computer system 109 is a central store computer, a personal computer, a server, or any other data processing system known in the art. The network interface would typically be coupled to a bus of the reader 105 so that it can receive data, such as the list of tags 101A-N identified in an interrogation, one or more error message associated with tags 101A-N, and the TIDs of one or more of tags 101A-N, or data obtained from one or more ICs or components of ICs within the reader 105. Additional details about the reader 105 are discussed below in connection with FIG. 2.

In one embodiment, each of tags 101A-N is a processing system that includes at least one commonly known RFID component (e.g., antenna 115A-N, a receive/transmit switch which controls the signal present on the antenna, etc.) for receiving or transmitting signals 111 from or to the reader 105. In one embodiment, each of the tags 101A-N includes at least one IC (not shown) that includes at least one of a memory, a processing block, a demodulator, a rectifier and power source, or a modulator. In one embodiment, each of the tags 101A-N includes a memory (not shown) used for data storage in at least one of a volatile manner or a non-volatile manner. In one embodiment, data stored in each of the tags 101A-N includes at least one of manufacturing data, EPC™, TID, user-programmed information, or any other type of information known to be stored in the memory of an RFID tag. Additional details about each of tags 101A-N is discussed below in connection with FIG. 2.

In one embodiment, the IC of each of the tags 101A-N is configured to perform at least one of error correction or error detection on data that is stored within the memory of each tag 101A-N. In one embodiment, the tags 101A-N are passive, semi-passive, or active tags. In one embodiment, the reader 105 transmits signals 111 to activate or interrogate one or more of tags 101A-N so as to obtain data stored within the memory of the one or more tags 101A-N. In one embodiment, the respective ICs of the tags 101A-N being interrogated are configured to use six (6) bits out of every twenty-two (22) bits in the memory of the respective IC for performing at least one of error correction or error detection on the data stored in the memory of the respective IC. In the 22 bits, sixteen (16) bits are dedicated to the data for which error correction and/or error detection is being performed. In one of embodiment, five (5) bits of the 6 bits dedicated to error correction and/or error detection are used, by the respective ICs of tags 101A-N, to perform error correction and one (1) of the 6 bits dedicated to error correction and/or error detection is used, by the respective ICs of tags 101A-N, for error monitoring or error detection.

In one embodiment, each time the respective ICs of tags 101A-N detects at least one of a single bit-flip or a multiple bit-flip, the error is counted and stored in a memory within the respective ICs of tags 101A-N. In one embodiment, the count is continually updated to obtain a total number of errors that have been detected for a respective one of tags 101A-N. In one embodiment, two separate counts can be maintained—one for a total number of single bit-flips for a respective one of the tags 101A-N and one for a total number multiple bit-flips for a respective one of the tags.

In one embodiment, the respective ICs of tags 101A-N perform error correction when a single bit-flip that affects only 1 bit of the 16 bits of data is detected. In one embodiment, each time the respective ICs of tags 101A-N detect a single bit-flip, at least one of the count, the corrupted data, a warning of the corrupted data, an indication that the corrupted data has been corrected, or the corrected data is provided to the reader 105 via signals 111.

In one embodiment, the respective ICs of tags 101A-N do not perform error correction when a multiple bit-flip that affects two or more bits of 16 bits of data is detected. In this embodiment, when the bit-flip affecting two or more of the 16 bits of data is detected by the respective ICs of tags 101A-N, at least one of the count, the corrupted data, or a warning of such data corruption is provided, via signals 111, to the reader 105.

In one embodiment, when the tags 101A-N detect at least one of a single bit-flip or a multiple bit-flip affecting the 16 data bits, the respective tags 101A-N communicate at least one of a warning of the detected error, a total number of the detected errors, manufacturing data, or a tag identification (TID), via signals 111, to the reader 105. In one embodiment, when the tags 101A-N detect at least one of a single bit-flip or a multiple bit-flip affecting the 16 data bits, the respective tags 101A-N communicate a warning to the reader 105 that the requested data is corrupted. In this embodiment, an IC of the reader 105 (not shown) is configured to further interrogate the respective tags 101A-N and obtain at least one of the count of the errors, the manufacturing data, or the TID.

In one embodiment, at least one of the detected error, the count of the detected errors, the manufacturing data, or the TID is provided by the reader 105 to a computer system 109 or data processing device 109 associated with an entity that designs or manufactures the IC of the problematic tag. In one embodiment, the reader 105 provides the information about at least one of the detected error, the count of the detected errors, the manufacturing data, or the TID to the computer system 109 or data processing device 109 via network interface 117 and network(s) 107. In one embodiment, the entity that designed or manufactured the defective ICs of tags 101A-N can use the received information to trace the source of the defect or failure mechanism that caused the memory bit-flip. In one embodiment, the entity that designed or manufactured the defective ICs of tags 101A-N can use the information to locate the batch of die that were manufactured together with the die of the defective IC and diagnose/determine whether there were any design or manufacturing process deviations. This can be used to improve design and manufacturing for the ICs included in system 100. Specifically, this can be used to improve design and manufacturing for the ICs of tags 101A-N.

In one embodiment, the tags 101A-N include non-volatile memory for storing data, which may be defective due to manufacturing process variations. In one embodiment, the non-volatile memory of the tags 101A-N is interrogated by the reader 105. In one embodiment, the reader 105 can also store data in the non-volatile memory of the tags 101-A-N. In one embodiment, the data in the non-volatile memory includes (1) user data, which may be written or read one or more users of the system 100; (2) manufacturing data, which is written by manufacturers and generally not useful to users of system 100. In one embodiment, the respective ICs of tags 101A-N perform error correction detect or correct bit-flips within the non-volatile memory of the tags 101A-N. In one embodiment, the respective ICs of tags 101A-N perform the error correction when the user data is written to or read from the non-volatile memory of the tags 101-A-N. It is known that bit-flips that affect memory (e.g., non-volatile memory) can be an indication of manufacturing defects that may need to be analyzed. In one embodiment, when bit-flipping occurs (in user data), the reader 105 is notified by the respective tag(s) 101A-N, the reader 105 will interrogate the tags 101A-N to read the respective tag's manufacturing data and analyze the manufacturing data to determine if the bit-flip is a result of a manufacturing defect. In one embodiment, if the bit-flip is a result of a manufacturing defect. In one embodiment, if the bit-flip is attributable to a manufacturing defect, then the reader 105 analyzes the manufacturing data to determine the source or location of the manufacturing detect. In this way, the error correction performed by the ICs of the tags 101A-N is not only used to correct user data, but is also used as an indicator of the manufacturing robustness of the tags 101A-N. This indication is a result of the tags 101A-N prompting the reader 105 to read manufacturing data stored in a respective one of tags 101A-N when any error (e.g., a bit-flip) in user data is detected.

Figure 2:
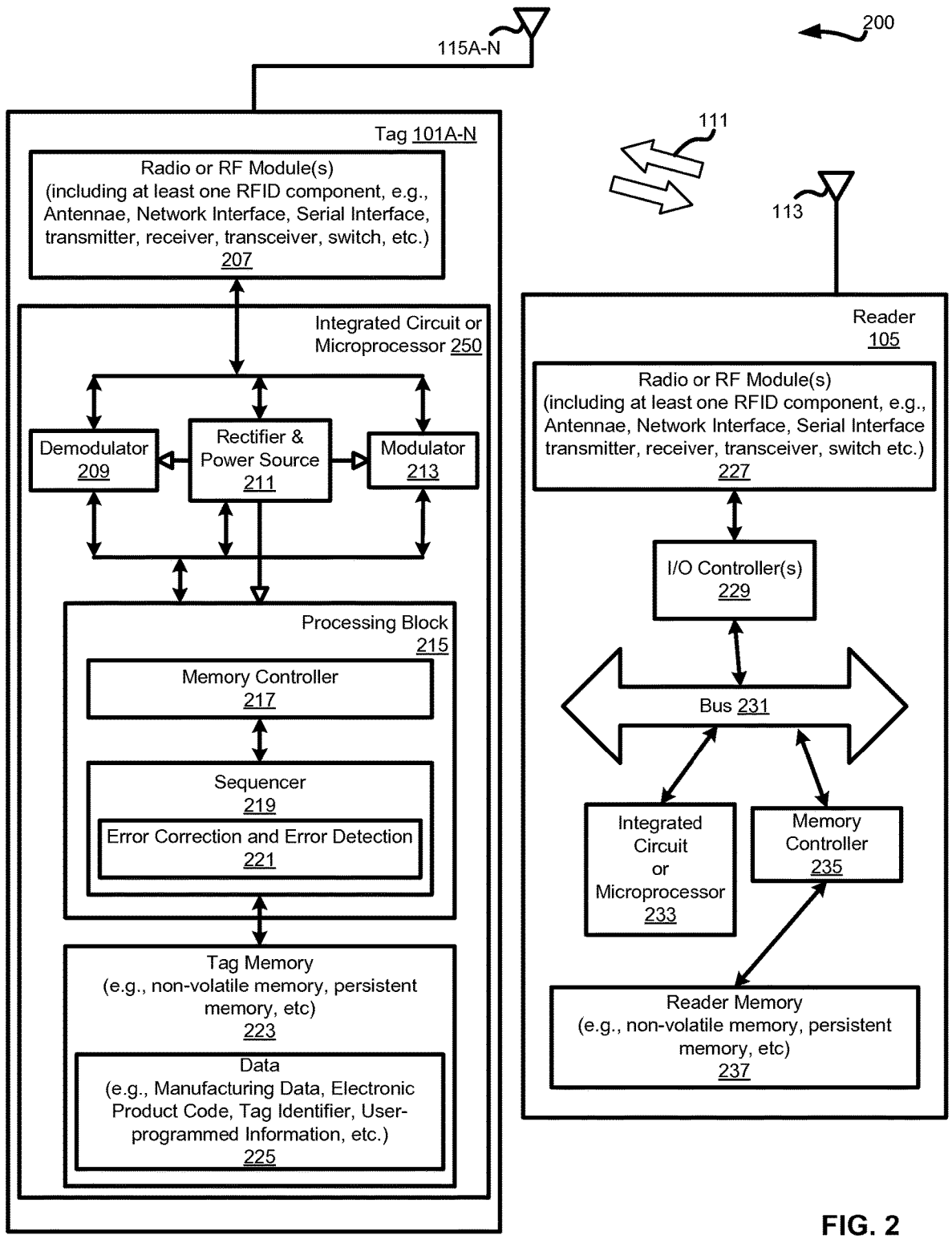
FIG. 2 is a block diagram illustrating a radio frequency identification (RFID) system in accordance with at least one of the embodiments described herein.

FIG. 2 is a block diagram illustrating a radio frequency identification (RFID) system 200 in accordance with at least one of the embodiments described herein. In FIG. 2, the system 200 includes additional details about the components of the reader 105 and the tag(s) 101A-N described above in connection with FIG. 1.

Referring to the reader 105 of system 200, which is a processing system that typically includes radio 227 or a radio frequency (RF) module(s) 227. The radio/RF module(s) 227, in one embodiment, includes at least one common RFID component, e.g., one or more antennae, one or more network interfaces, one or more serial interfaces, one or more transmitters, one or more receivers, one or more transceivers, one or more switches, circuitry for receiving RF energy and reflecting or transmitting wirelessly information stored in memory 237, etc. In one embodiment, the radio/RF module(s) 227 includes one or more RF module(s) that each include a printed circuit board (PCB), a transmit or receive circuit, an antenna, and a serial interface for communication to the IC/microcontroller 233. In one embodiment, the radio/RF module(s) 227 includes at least one of a transmitter module, a receiver module, a transceiver module, or a system-on-a-chip (SOC) module.

In one embodiment, the radio/RF module(s) 227 (including its respective components) is coupled to an I/O (input/output) controller 229 within the reader 105. In one embodiment, the reader 105 is coupled, via the radio/RF module(s) 227, to at least one antenna 113. Please note that the antenna 113 is illustrated in FIG. 2 for the sake of clarity, even though the radio/RF module(s) 227 can include one or more antennae. For example, and in one embodiment, the receiver of the radio/RF module(s) 227 may have its own antenna 113, and the transmitter 227 of the radio/RF module(s) 227 may have its own antenna 113. It will be appreciated by those in the art that the receiver and the transmitter (alternatively, a transceiver) of reader 105 may share the same antenna 113 provided that there is a receive/transmit switch which controls the signal present on the antenna and which isolates the receiver and transmitter from each other. The receiver and the transmitter of the reader 105 may be similar to receiver and transmitter units found in conventional readers. In North America, the receiver and transmitter for RFID typically operate in a frequency range of about 915 megahertz (e.g., 902 MHz-928 MHz) using spread spectrum techniques (e.g., frequency hopping). In Europe, the frequency range is about 866 megahertz (e.g., 865.7 MHz-867.7 MHz). Other regions have set aside, or are in the process of setting aside, frequency ranges for operation— these ranges of operation typically lie somewhere in the overall range of 200 MHz to 5 GHz. Each of the receiver and the transmitter (alternatively, a transceiver) of the reader 105 is coupled to the I/O controller 229 which controls the receipt of data from the receiver and the transmission of data, such as commands, from the transmitter. The I/O controller 229 of reader 105 can be coupled to a bus 231 within reader 105 which is in turn coupled to a IC/microprocessor 233, a memory controller 235, and a reader memory 237 that are within reader 105. In one embodiment, the IC/microprocessor 233 includes at least one of the memory controller 235 or the reader memory 237.

There are various different possible implementations for the processing system that makes up reader 105. In one embodiment, the IC/microprocessor 233 is a programmable microcontroller, such as an 8051 microcontroller or other well-known microcontrollers or microprocessors (e.g. a PowerPC microprocessor). In one embodiment, the memory 237 includes at least one of a volatile memory (e.g., dynamic random access (DRAM) memory, etc.) or a non-volatile memory (e.g., flash memory, EEPROM, etc.) for storing data and software programs.

In one embodiment, the reader 105 may include a memory controller 235 that provides access to the memory 237. In one embodiment, the memory controller 235 is a storage access module that is used by the IC/microcontroller 233 to access memory 237. In one embodiment, the memory 237 contains a program that controls the operation of the IC/microprocessor 233 and also contains data used during the processing of tags (e.g., during the interrogation of tags, requesting manufacturing data, requesting TID, requesting information about a number of detected errors, requesting information about one or more detected errors, analyzing the manufacturing data to determine the source or location of a manufacturing defect, etc.). In one embodiment, the memory 237 includes a computer program that causes the microprocessor of reader 105 to decode received tag data with the appropriate tag-to-reader protocol scheme. The reader 501 may also include a network interface in the radio/RF module(s) 227, such as an Ethernet interface, universal bus interface, or Wi-Fi interface (such as IEEE 802.11, 802.11a, 802.11b, 802.16a, Bluetooth, Proxim's OpenAir, HomeRF, HiperLAN and others), which allows the reader to communicate to other processing systems through a network (not shown in FIG. 2 but described above in connection with FIG. 1), including without limitation a computer system that is associated with a designer or manufacturer of the reader 105 or the tags 101A-N (not shown in FIG. 2 but described above in connection with FIG. 1). The network interface of the radio/RF module(s) 227 would typically be coupled to the bus 231 so that it can receive data, such as the list of tags 101A-N identified in an interrogation, one or more error messages associated with tags 101A-N, and the TIDs of one or more of tags 101A-N, or data obtained from the IC/microprocessor 233 or from the memory 237 of the reader 105.

Each of the tags 101A-N of system 200 is a processing system that typically includes a receiver and a transmitter (alternatively, a transceiver 227) in a radio/RF module(s) 207. In one embodiment, the radio/RF module(s) 207 includes at least one common RFID component, e.g., one or more antennae, one or more network interfaces, one or more serial interfaces, one or more transmitters, one or more receivers, one or more transceivers, one or more switches, circuitry for receiving RF energy and reflecting or transmitting wirelessly information stored in memory 223, etc. In one embodiment, the radio/RF module(s) 207 is a RF module(s) that includes a printed circuit board (PCB), a transmit or receive circuit, an antenna, and a serial interface for communication to the tag's IC/microcontroller 250. In one embodiment, the radio/RF module(s) 207 includes at least one of a transmitter module, a receiver module, a transceiver module, or a system-on-a-chip (SOC) module.

In one embodiment, each of tags 101A-N includes an I/O (input/output) controller (not shown in FIG. 2) that enables communication between the radio/RF module(s) 207 and the IC/microcontroller 250. In one embodiment, each of the tags 101A-N is coupled to at least one respective antenna 115A-N. Please note that the antenna 115A-N is illustrated in FIG. 2 for the sake of clarity, even though the radio/RF module(s) 207 can include one or more antennae. For example, and in one embodiment, the respective receiver of radio/RF module(s) 207 may have its own antenna 115A-N, and the transmitter of radio/RF module(s) 207 may have its own antenna 115A-N. It will be appreciated by those in the art that the receiver and the transmitter (alternatively, a transceiver) of each of tags 101A-N may share the same antenna 115A-N provided that there is a receive/transmit switch which controls the signal present on the antenna and which isolates the receiver and transmitter from each other. The receiver and the transmitter of each of the tags 101A-N may be similar to receiver and transmitter units found in conventional tags. In North America, the receiver and transmitter for RFID typically operate in a frequency range of about 915 megahertz (e.g., 902 MHz-928 MHz) using spread spectrum techniques (e.g., frequency hopping). In Europe, the frequency range is about 866 megahertz (e.g., 865.7 MHz-867.7 MHz). Other regions have set aside, or are in the process of setting aside, frequency ranges for operation—these ranges of operation typically lie somewhere in the overall range of 200 MHz to 5 GHz. Each of the receiver and the transmitter (alternatively, a transceiver) of the each of tags 101A-N is coupled to the I/O controller (not shown) which controls the receipt of data from the receiver and the transmission of data, such as commands, from the transmitter. The I/O controller (not shown) of each of tags 101A-N can be coupled to a bus (not shown) within each of tags 101A-N which is in turn coupled to a IC or microprocessor 250.

There are various different possible implementations for the processing system that makes up each of tags 101A-N. In one embodiment, the IC/microprocessor 250 is a programmable microcontroller, such as an 8051 microcontroller or other well-known microcontrollers or microprocessors (e.g. a PowerPC microprocessor).

In one embodiment, each of the tags 101A-N is a Very Low Cost (VLC) tag that includes at least the antenna 115A-N and the IC/microprocessor 250. In one embodiment, the IC/microprocessor 250 includes at least one of memory 223, a rectifier and power source 211, a demodulator 209, a modulator 213, or a processing block 215.

In one embodiment, the IC/microprocessor 250 implements a command protocol and accesses data 225 stored in memory 223. In one embodiment, the memory 223 includes at least one of a volatile memory (e.g., dynamic random access (DRAM) memory, etc.) or a non-volatile memory (e.g., flash memory, EEPROM, etc.) for storing data 225, command protocols, or software programs. In one embodiment, the non-volatile memory of memory 223 is read-only memory. In one embodiment, the memory 233 is exclusively non-volatile memory so that data 255 is retained even when the circuits of IC/microprocessor 250 do not have power, as is frequently the case for passive or semi-passive tags.

In one embodiment, the data 225 is stored in the non-volatile memory of memory 223. In one embodiment, the data 225 includes at least one of manufacturing data, an electronic product code (EPC™), a tag or transponder identifier (TID), or user-programmed information. In one embodiment, the data 255 is stored in the non-volatile memory of memory 223. In one embodiment, the manufacturing data of one of tags 101A-N is unique to that specific one of tags 101A-N, i.e., none of tags 101A-N have the exact same manufacturing data. In one embodiment, the manufacturing data includes, but is not limited to, information about a wafer number, information about a manufacturer of the tag, information about a wafer lot number, information about a manufacturing process of a wafer comprising a die of the IC, or information about a location of the die on the wafer. In one embodiment, the EPC™ is an identifier for a good or product that the tag is attached to that provides a unique identity for that good or product based on one or more definitions determined by the EPCglobal Tag Data Standard, which is an open standard freely available for download from the website of EPCglobal, Inc.™ In one embodiment, the TID is programmed by the manufacturer of the tags 101A-N. In one embodiment, the TID for each of tags 101A-N is unique. In one embodiment, the TID includes, but is not limited to, at least one of a class ID, a mask designer ID, a model number, an XTID header, or a serial number. In one embodiment, the TID is a unique number used to uniquely identify a respective one of tags 101A-N or to uniquely identify a good/object that the respective one of tags 101A-N is affixed to. In one embodiment, the user-programmed information is user-specific data, e.g., data associated with a purchaser of the tags 101A-N. In one embodiment, the user-programmed information is set by the purchaser of the tags 101A-N.

In one embodiment, the memory 223 contains at least one of the following four types of non-volatile memory banks: (i) a reserved memory bank; (ii) an EPC™ memory bank; (iii) a TID memory bank; or (iv) a user memory bank. In one embodiment, the reserved memory stores a kill password and an access password. The kill password is used to permanently disable the tag, while the access password is set to lock or unlock the tag's read and write capabilities. In one embodiment, each of the kill and access passwords are at least thirty-two (32) bits. The reserved memory bank can be made so that it is only writable when certain passwords for the tags 101A-N are being specified. In one embodiment, the EPC™ memory bank stores the EPC™. In one embodiment, the EPC™ memory bank has a minimum of 96 bits of writeable memory. In one embodiment, at least one of the tags 101A-N is configured to allocate additional bits to the EPC™ memory bank from the user memory bank. In one embodiment, the TID memory bank is used to store the TID, which is typically not changeable. In one embodiment, there are 32-64 bits allocated to the TID memory bank. In one embodiment, the user memory bank is the extended memory bank used for storing additional or user-specific information. In one embodiment, there is no standard on how many bits of the user memory bank are writeable on each of the tags 101A-N. In one embodiment, the user memory bank is in the range of 512 bits-8 kilobytes. In one embodiment, the memory 223 includes a checksum that may be used for error detection.

In one embodiment, the IC/microcontroller 250 includes a rectifier and power source (RPS) 211. The RPS 211, in one embodiment, is implemented in any way known in the art, for harvesting raw RF energy received via at least one of antenna 115A-N or radio/RF module(s) 207. In one embodiment, RPS 211 includes at least one rectifier. In one embodiment, when an RF wave is received by RPS 211 via at least one of antenna 115A-N or radio/RF module(s) 207, then the RPS 211 generates DC power for the electrical circuits of IC/microprocessor 250. In a further embodiment, the RPS 211 generates power in this way for either or both reader-to-tag and tag-to-reader sessions, whether or not the received RF wave is modulated. In FIG. 2, the three (3) open-headed arrows originating from RPS 211 and terminating at each of demodulator 209, modulator 213, and processing block 215 indicate the power generation. It is to be appreciated that, in one embodiment, the RPS 211 is configured to power memory 211. For the sake of brevity and clarity, an open-headed arrow for memory 223 is not provided in FIG. 2.

In one embodiment, the IC/microcontroller 250 includes a demodulator 209. In one embodiment, the demodulator 209 is used to demodulate one or more signals 111 (e.g., RF signals) received via at least one of antenna 115A-N or radio/RF module(s) 207. In one embodiment, the radio/RF module(s) 207 includes, for example, a group of nodes for proper routing of received signals. In one embodiment, radio/RF module(s) 207 includes, for example, at least one receive/transmit switch that can route the received signal(s). In one embodiment, the demodulator 209 is implemented in any way known in the art, for example including an attenuator stage, an amplifier stage, etc.

In one embodiment, the IC/microcontroller 250 includes a modulator 213. In one embodiment, one or more signals 111 include one or more interrogation signals. In one embodiment, the antenna 115A-N receives interrogation signals 111 and reflects the interrogation signals 111 back to the reader 105 in response to a modulation signal created by the modulator 213 of the IC/microprocessor 250. The modulator 213, in one embodiment, is used to modulate an output signal generated by processing block 215. In one embodiment, the modulated signal is transmitted via at least one of antenna 115A-N or radio/RF module(s) 207, and therefore used to drive the load presented by at least one of antenna 115A-N or radio/RF module(s) 207. Modulator 213 may be implemented in any way known in the art, including, but not limited to a driver stage or an amplifier stage.

In one embodiment, demodulator 209 and modulator 213 may be combined in a single transceiver circuit. In one embodiment, modulator 213 may include a backscatter transmitter or an active transmitter. In one embodiment, demodulator 209 and modulator 213 are part of processing block 215.

In one embodiment, the IC/microcontroller 250 includes a processing block 215. Processing block 215 may be implemented in any way known in the art. For example, processing block 215 may include a number of components, such as a processor, memory, a decoder, an encoder, and so on. In one embodiment, processing block 215 includes a memory controller 217 and a sequencer 219. Each of the memory controller 217 and the sequence 219 may be implemented as computer-executable instructions within processing block 215. In one embodiment, the sequencer 219 includes computer executable-instructions 221 enabling IC/microprocessor 250 to perform at least one of error correction or error detection. In one embodiment, the computer executable-instructions 221 enable performance of at least one of error correction or error detection in accordance with the description provided above in connection with FIG. 1. In one embodiment, the computer executable-instructions 221 enable performance of at least one of error correction or error detection in accordance with the description provided below in connection with FIG. 3.

Figure 3:
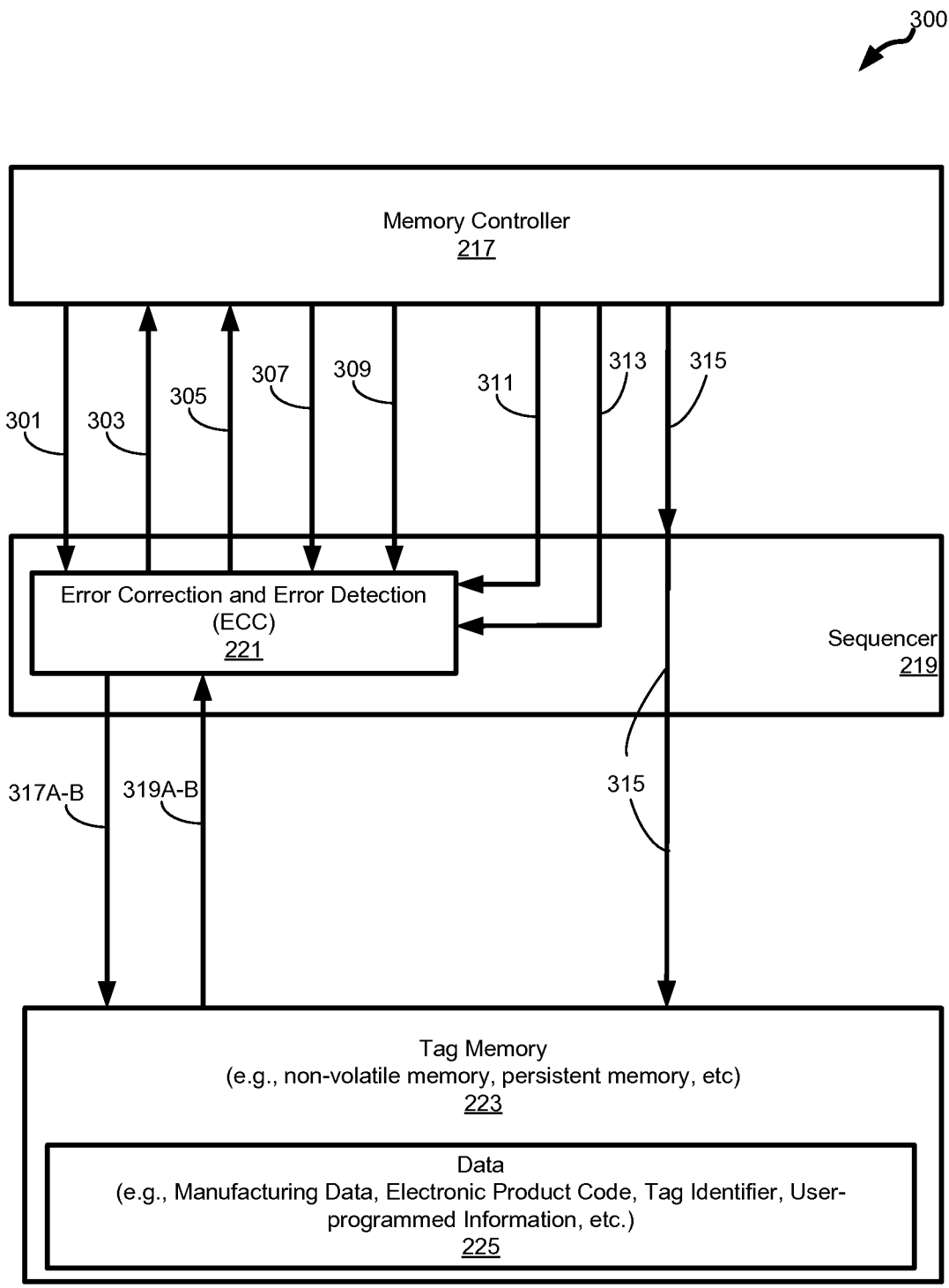
FIG. 3 is a block diagram illustrating a performance of at least one of error detection or error correction using at least one of the components of the tags illustrated in FIG. 2, according to at least one of the embodiments described herein.

FIG. 3 is a block diagram 300 illustrating a performance of at least one of error detection or error correction using the IC/microcontroller 250 of the tag 101A-N illustrated in FIG. 2, according to at least one of the embodiments described herein. As explained above in connection with FIG. 2, in response to receiving an interrogation signal from a reader 105, a tag's IC/microprocessor 250 performs operations to fetch and provide data 225 to the requesting reader 105. In one embodiment, the tag's IC/microprocessor 250 processes the interrogation signal by requesting the memory controller 217 to access memory 223 to obtain data 225.

In one embodiment, the request for data 225 from memory 223 begins with a request from the memory controller 217 to the sequencer 219 for 16 bits of data 225 via input signal 301. The input signal can also referred herein as SQ_DI[15:0]. In embodiment, the 16 bits of data can include at least one of the EPC™ or user-programmed information.

In one embodiment, the sequencer 219 provides the input signal 301 to the error correction and error detection (ECC) module 221, which includes the computer-executable instructions for performing at least one of error correction or error detection on the requested 16 bits of data. In one embodiment, the input data signal 301 is processed by the ECC module 221 of the sequencer 219 into processed data signal 317A-B to store the 16 bits of data 225 into memory 223 requested by the memory controller 217 using input control signal 313 (SQ_STORE).

In one embodiment, the processed signal 317A-B includes the following two parts: (i) a processed signal 317A that includes 16 data bits reserved for the data 225 being requested; and (ii) a processed signal 317B that includes 6 parity bits that are generated and added on by the ECC module 221. In one embodiment, the 6 parity bits are used by the ECC module 221 for at least one of error correction or error detection of the 16 bits by ECC module 221. The processed signal 317A-B can be referred to herein as NVM_DI[22:1]. The processed signal 317A can be referred to herein as NVM_DI[16:1]. The processed signal 317B can be referred to herein as NVM_DI[22:17].

In one embodiment, in response to receiving the processed signal 317A-B, the memory 223 provides a return signal 319A-B to the ECC module 221. In one embodiment, the return signal 319A-B includes the following two parts: (i) a return signal 319A that includes the 16 requested data bits; and (ii) a return signal 319B that includes the 6 parity bits. The return signal 319A-B can also be referred to herein as NVM_DO[22:1]. The return signal 319A can also be referred to herein as NVM_DO[16:1]. The return signal 319B can also be referred to herein as NVM_DO[22:17].

In one embodiment, when the ECC module 221 receives the return signal 319A-B, the ECC module 221 performs at least one of error correction or error detection on the 16 bits of data 225 using the 6 parity bits. In one embodiment, if the ECC module 221 does not detect any bit-flips, then the ECC module 221 provides an output signal 303 including the 16 bits of data 225 to the memory controller 217, which subsequently provides the data to the reader 105 of FIG. 1 or 2. In one embodiment, the output signal 303 can also be referred to as SQ_DO[15:0]. In one embodiment, when no error is detected by the ECC module 221, the SQ_DI[15:0] should be equal to the SQ_DO[15:0].

In one embodiment, if the ECC module 221 detects a memory bit-flip that is experienced by only one of the 16 bits, then the ECC module 221 corrects the single bit-flip using the 6 parity bits. Following the correction, the ECC module 221 provides the output signal 303 (also known as SQ_DO[15:0]) including the corrected 16 bits of data 225 to the memory controller 217, which subsequently provides the data to the reader 105 of FIG. 1 or 2. In one embodiment, following the correction of the single bit-flip by the ECC module 221, the SQ_DI[15:0] should be equal to the SQ_DO[15:0].

In one embodiment, if the ECC module 221 detects a memory bit-flip that is experienced by more than one of the 16 bits, then the ECC module 221 does not correct the multiple bit-flips using the 6 parity bits. Instead, the ECC module 221 provides the corrupted version of the 16 bits to the memory controller as the output signal 303 (also known as SQ_DO[15:0]). The memory controller subsequently provides the corrupted data to the reader 105 of FIG. 1 or 2. In addition, and in one embodiment, the ECC module 221 can also provide a warning to the memory controller that the 16 bits are experiencing multiple bit-flips, which is then provided the data to reader 105 of FIG. 1 or 2. In one embodiment, following the detection of the multiple bit-flips by the ECC module 221, the SQ_DI[15:0] should not be equal to the SQ_DO[15:0].

In one embodiment, when the ECC module 221 detects either a single bit-flip or multiple bit-flips, the ECC module 221 uses at least two bits to count each of the detected errors and provides the count, via an output signal 305 to the memory controller 217, which subsequently provides the count to the reader 105 of FIG. 1 or 2. The output signal 305 can also be referred to herein as SQ_STATUS[10:9]. In one embodiment, the ECC module 221 provides at least two different counts—a first count for errors that are single bit-flips and a second count for errors that are multiple bit-flips. In one embodiment, after the count of error is equal to three (3), the IC/microcontroller 250 generates a power-on-reset (POR) signal that resets the components of the IC/microcontroller 250 when the tag receives power. The POR signal can be generated by a POR circuit that is included in the tag 101A-N or in the tag's IC/microcontroller 250.

In one embodiment, the IC/microcontroller 250 can disable the ECC module 221 so that none of the error correction or the error detection is performed. In one embodiment, the IC/microcontroller 250 provides a disabling signal 307 through the memory controller 217 to the ECC module 221. In one embodiment, the disabling signal 307 includes at least 2 bits which can be used to turn off the functionality of the ECC module 221. The disabling signal 307 can also be referred to herein as SQ_ECC_READ_MODE[1:0].

One scenario that may occur when storing or retrieving data from memory 223 is that after certain permanent bits of a byte or a word are erased from the memory 223, i.e. their values are changed from '1' to '0' then any attempts to access the memory 223 fails. In this scenario, it may be beneficial to disable the ECC module 221 using the disabling signal 307 in order to avoid a situation where one or more of the permanent bits of the 16 data bits encoded in the processed signal 317A (also referred to as NVM_DI[16:1]) are not written into the memory 223. If such a situation does occur, each of the 16 data bits encoded in the processed signal 317A (also referred to as NVM_DI[16:1]) will be erased to a value of "0," and any data that was previously stored in the permanent bits will be irretrievably lost. To avoid this scenario, in one embodiment, the IC/microcontroller 250 can disable the ECC module 221 by asserting a disabling signal 307 with a "no_erase" feature whenever the memory 223 is to be accessed. In one embodiment, in response to the disabling signal being received by the ECC module 221, the memory 223 does not store the 16 data bits encoded in the processed signal 317A (also referred to as NVM_DI[16:1]). Instead, the memory 223 compares the 16 data bits encoded in the processed signal 317A (also referred to as NVM_DI[16:1]) with the corresponding 16 data bits in data 225, and uses only the 16 data bits found in data 225. In this way, the "no_erase" feature of the disabling signal enforces the rule that these permanent bits can only be changed from "0" to "1" and not vice versa.

The following Pseudo-code 1 provides one embodiment of programming the tag's IC to disable ECC correction or detection so as to avoid inadvertently corrupting or deleting one or more permanent bits that are programmed or stored in memory and that are part of the 16 data bits being requested from memory 223. In the following Pseudo-code 1, config_reg_upper[15:0] represents the above-mentioned permanent bits that should not be erased. DI[15:0] represents data to be stored in the tag memory 223. If any bit in config_reg_upper[15:0] is '1', by Boolean logic, any bit in DI[15:0] is always '1.' In this way, Pseudo-code 1 prevents any permanent bit from being changed from '1' to '0'.

Pseudo-Code 1:
  DI[15]=config_req_upper[15]
  ||(command_blockpermalock&&param_ blockpermalock_mask_four[3]);
  DI[14]=config_req_upper[14]
  ||(command_blockpermalock&&param_ blockpermalock_mask_four[2]);

DI[13]=config_req_upper[13]
||(command_blockpermalock&&param_blockpermalock_mask_four[1]);
DI[12]=config_req_upper[12]
||(command_blockpermalock&&param_blockpermalock_mask_four[0]);
DI[11]=config_req_upper[11];
DI[10]=config_req_upper[10];
DI[9]=config_req_upper[9];
DI[8]=config_req_upper[8];
DI[7]=config_req_upper[7]
||((command_lock&&param_lock_payload[18]
&¶m_lock_payload[8]&&permalock_the_kill_password))||;
DI[6]=config_req_upper[6]
||((command_lock&&param_lock_payload[14]
&¶m_lock_payload[4]&&permalock_the_epc_bank))||;
DI[5]=config_req_upper[5]
||((command_lock&&param_lock_payload[16]
&¶m_lock_payload[6]&&permalock_the_access_password))||;
DI[4]=config_req_upper[4]
||((command_lock&&param_lock_payload[10]
&¶m_lock_payload[0]&&permalock_the_userbank))||;
DI[3]=config_req_upper[3]
||((command_lock&&param_lock_payload[18]
&¶m_lock_payload[8]&&(!permalock_the_kill_password)))||comman_kill;
DI[2]=config_req_upper[2]
||((command_lock&&param_lock_payload[14]
&¶m_lock_payload[4]&&(!permalock_the_epc_bank)));
DI[1]=config_req_upper[1]
||((command_lock&&param_lock_payload[16]
&¶m_lock_payload[6]&&(!permalock_the_access_password));
DI[0]=config_req_upper[0]
||((command_lock&&paramlock_payload[10]&&param_lock_payload[0]&&(!permalock_the_user_bank))||command_status.

In one embodiment, the IC/microcontroller 250 can test the functioning of the ECC module 221 to determine if at least one of the error correction or the error detection is being performed. In one embodiment, the IC/microcontroller 250 provides a test signal 309 through the memory controller 217 to the ECC module 221. In one embodiment, the test signal 309 includes at least 1 bit which can be used to deliberately insert errors into the input data signal 301 (also referred to as SQ_DI[15:0]). The test signal 309 can also be referred to herein as SQ_ECC_WRITE_MODE[1:0].

Each of input signal 311 (also referred to as SQ_RECALL_DONE), input signal 313 (also referred to as SQ_STORE), and input signal 315 (also referred to as SQ_A) are memory control signals used to control access to or by each of memory controller 217, ECC module 221, sequencer 219, and memory 223.

The following Table 1, provides one embodiment of a process of using the disabling signal 307 (also referred to herein as SQ_ECC_READ_MODE[1:0]) and the test signal 309 (also be referred to herein as SQ_ECC_WRITE_MODE[1:0]).

TABLE 1

| SQ_ECC_WRITE_MODE: SQ_DI[15:0] processed into | STORE(WRITE) | |
|---|---|---|
| NVM_DI[22:1] | NVM_DI[16:1] | NVM_DI[22:17] |
| 0: Normal, Write with ECC | SQ_DI[15:0], i.e., NVM_DI[16] = SQ_DI[15]; NVM_DI[15] = SQ_DI[14]; . . . NVM_DI[1] = SQ_DI[0]. | Computed 6-bit ECC based on SQ_DI [15:0], i.e., NVM_DI[22] = $p_5$ NVM_DI[21] = $p_4$ . . . NVM_DI[17] = $p_0$ |
| 1: Debug, Write with incorrect ECC | SQ_DI[15:0] | NVM_DI[22] = SQ_DI[15]; NVM_DI[21] = SQ_DI[14]; . . . NVM_DI[17] = SQ_DI[10]. |
| SQ_ECC_READ_MODE[1:0] NVM_DO[22:1] processed into SQ_DO[15:0] | RECALL (READ) SQ_DO[15:0] | |
| 00: Normal, Read Data with ECC Correction | Corrected NVM_DO[16:1], i.e. SQ_DO[15] = Corrected NVM_DO[16]; SQ_DO[14] = Corrected NVM_DO[15]; . . . SQ_DO[0] = Corrected NVM_DO[1]. | |
| 01: Debug, Read Data without Correction | Uncorrected NVM_DO[16:1] | |
| 10: Debug, Read 6-bit ECC and lower 10 Bit are ignored | {NVM_DO[22:17], 10'hXXX}, i.e., SQ_DO[15] = NVM_DO[22]; SQ_DO[14] = NVM_DO[21]; . . . SQ_DO[10] = NVM_DO[17]; SQ_DO[9:0] = Not Applicable or Not Used. | |
| 11: Undefined | | |

Figure 4:
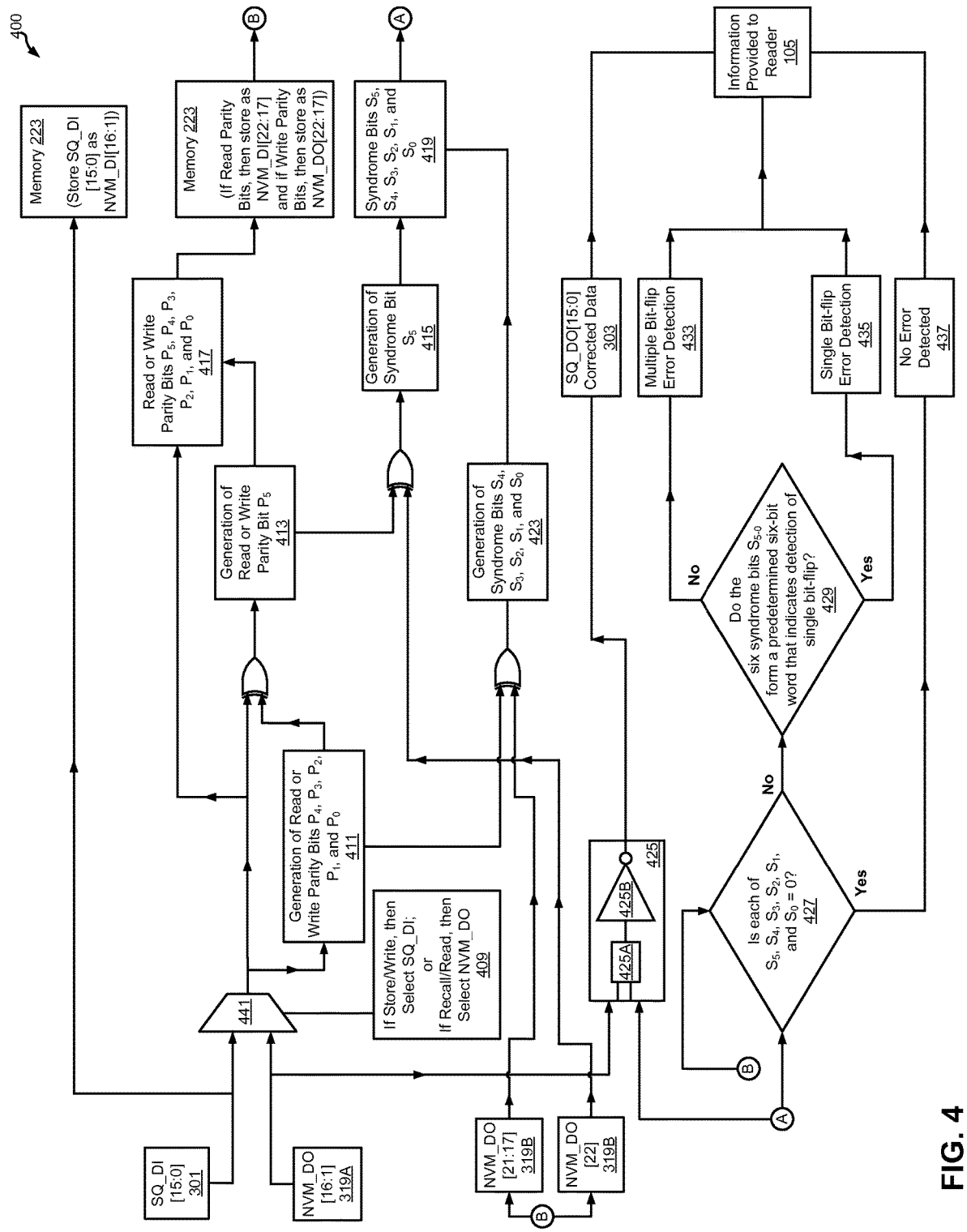
FIG. 4 is a schematic diagram illustrating a performance of at least one of error detection or error correction using at least one of the components of the tags illustrated in FIG. 3, according to at least one of the embodiments described herein.

FIG. 4 is a schematic diagram 400 illustrating a performance of at least one of error detection or error correction using at least one of the components of the tag illustrated in FIG. 3, according to at least one of the embodiments described herein. In FIG. 4, the major blocks of the ECC module 221 of FIG. 3 are illustrated. The discussion provided below in connection with FIG. 4 is based on the description provided in connection with FIG. 3. Specifically, the description provided below begins after the ECC module 221 of FIG. 3 receives an input signal 301 (also referred to as SQ_DI[15:0]).

In one embodiment, a multiplexer 441 of ECC module 221 receives the input signal 301 (also known as SQ_DI [15:0]) having the request for the 16 bits from memory 223. The multiplexer 441 also receives the 16 data bits of the output signal 319A, which is also referred to as NVM_DO [16:1]. In one embodiment, the multiplexer 441 uses a control signal 409 to select either the input signal 301 (also known as SQ_DI[15:0]) or the output signal 319A (also referred to as NVM_DO[16:1]). If data is being provided from the memory controller 217 to memory 223, then the input signal 301 (also known as SQ_DI[15:0]) is selected. On the other hand, if data is being provided from the memory 223 to the memory controller 217, then the output signal 319A (also referred to as NVM_DO[16:1]) is selected.

In one embodiment, during a store (write) cycle, 6 write parity bits are generated based on 16 data bits encoded in the input signal 301 (also known as SQ_DI[15:0]). In one embodiment, the 6 write parity bits are written, together with the 16 data bits, into memory 223 as the processed signal 317A-B (also referred to as NVM_DI[22:1]).

The following Pseudo-code 1 provides one embodiment of generating 6 write parity bits (referred to in Pseudo-code 1 as $DIP_{0-5}$) based on 16 data bits (referred to in Pseudo-code 2 as $DI_{0-15}$) encoded in the input signal 301 (also known as SQ_DI[15:0]).

Pseudo-Code 1:
Write: $DIP_0$ is computed based on $DI_{0-15}$
$DIP_0 = DI_0\,\hat{}\,DI_1\,\hat{}\,DI_3\,\hat{}\,DI_5\,\hat{}\,DI_7\,\hat{}\,DI_9\,\hat{}\,DI_{11}\,\hat{}\,DI_{13}\,\hat{}\,DI_{15}$;
$DIP_1 = DI_0\,\hat{}\,DI_2\,\hat{}\,DI_3\,\hat{}\,DI_6\,\hat{}\,DI_7\,\hat{}\,DI_{10}\,\hat{}\,DI_{11}\,\hat{}\,DI_{14}\,\hat{}\,DI_{15}$;
$DIP_2 = DI_0\,\hat{}\,DI_4\,\hat{}\,DI_5\,\hat{}\,DI_6\,\hat{}\,DI_7\,\hat{}\,DI_{12}\,\hat{}\,DI_{13}\,\hat{}\,DI_{14}\,\hat{}\,DI_{15}$;
$DIP_3 = DI_0\,\hat{}\,DI_8\,\hat{}\,DI_9\,\hat{}\,DI_{10}\,\hat{}\,DI_{11}\,\hat{}\,DI_{12}\,\hat{}\,DI_{13}\,\hat{}\,DI_{14}\,\hat{}\,DI_{15}$;
$DIP_4 = DI_1\,\hat{}\,DI_2\,\hat{}\,DI_3\,\hat{}\,DI_4\,\hat{}\,DI_5\,\hat{}\,DI_6\,\hat{}\,DI_7\,\hat{}\,DI_8\,\hat{}\,DI_9\,\hat{}\,DI_{10}\,\hat{}\,DI_{11}\,\hat{}\,DI_{12}\,\hat{}\,DI_{13}\,\hat{}\,DI_{14}\,\hat{}\,DI_{15}$; and
$DIP_5 = DI_0\,\hat{}\,DI_1\,\hat{}\,DI_2\,\hat{}\,DI_3\,\hat{}\,DI_4\,\hat{}\,DI_5\,\hat{}\,DI_6\,\hat{}\,DI_7\,\hat{}\,DI_8\,\hat{}\,DI_9\,\hat{}\,DI_{10}\,\hat{}\,DI_{11}\,\hat{}\,DI_{12}\,\hat{}\,DI_{13}\,\hat{}\,DI_{14}\,\hat{}\,DI_{15}\,\hat{}\,DIP_0\,\hat{}\,DIP_1\,\hat{}\,DIP_2\,\hat{}\,DIP_3\,\hat{}\,DIP_4 = DI_0\,\hat{}\,DI_1\,\hat{}\,DI_2\,\hat{}\,DI_4\,\hat{}\,DI_7\,\hat{}\,DI_8\,\hat{}\,DI_{11}\,\hat{}\,DI_{13}\,\hat{}\,DI_{14}$.

As used throughout this detailed description, the notation "$\hat{}$" refers a bitwise exclusive- or (XOR) operation.

In Pseudo-code 2, the 6 write parity bits are simplified using the following property: $DI_x\,\hat{}\,DI_x = 0$. In columns where there is an even number of x's, the terms cancel out; where there is an odd number of x's, the associated term remains. For example, in the $u_0$ column, there are 5 x's. That means, $DI_0$ XOR 5 times. 4 $DI_0$'s cancel out, and 1 $DI_0$ remains. The same for the $u_1$ and $u_2$, but not for the $u_3$, which has 4 x's.

In one embodiment, during the recall (read) cycle, 6 read parity bits are generated based on the 16 data bits encoded in the output signal 319A (also referred to as NVM_DO[16: 1]). In one embodiment, the 6 read parity bits are read, together with 16 data bits encoded in the output signal 319A, by the ECC module 221 as the return signal 319A-B (also referred to herein as NVM_DO[22:1]).

The following Pseudo-code 2 provides one embodiment of generating 6 read parity bits (referred to in Pseudo-code 2 as $DOP_{0-5}$) based on the 16 data bits (referred to in Pseudo-code 2 as $DO_{0-15}$) encoded in the output signal 319A (also referred to as NVM_DO[16:1]).

Pseudo-Code 2:
Read: $DOP_0$ is computed based on $DO_{0-15}$
$DOP_0 = DO_0\,\hat{}\,DO_1\,\hat{}\,DO_3\,\hat{}\,DO_5\,\hat{}\,DO_7\,\hat{}\,DO_9\,\hat{}\,DO_{11}\,\hat{}\,DO_{13}\,\hat{}\,DO_{15}$;
$DOP_1 = DO_0\,\hat{}\,DO_2\,\hat{}\,DO_3\,\hat{}\,DO_6\,\hat{}\,DO_7\,\hat{}\,DO_{10}\,\hat{}\,DO_{11}\,\hat{}\,DO_{14}\,\hat{}\,DO_{15}$;
$DOP_2 = DO_0\,\hat{}\,DO_4\,\hat{}\,DO_5\,\hat{}\,DO_6\,\hat{}\,DO_7\,\hat{}\,DO_{12}\,\hat{}\,DO_{13}\,\hat{}\,DO_{14}\,\hat{}\,DO_{15}$;
$DOP_3 = DO_0\,\hat{}\,DO_8\,\hat{}\,DO_9\,\hat{}\,DO_{10}\,\hat{}\,DO_{11}\,\hat{}\,DO_{12}\,\hat{}\,DO_{13}\,\hat{}\,DO_{14}\,\hat{}\,DO_{15}$;
$DOP_4 = DO_1\,\hat{}\,DO_2\,\hat{}\,DO_3\,\hat{}\,DO_4\,\hat{}\,DO_5\,\hat{}\,DO_6\,\hat{}\,DO_7\,\hat{}\,DO_8\,\hat{}\,DO_9\,\hat{}\,DO_{10}\,\hat{}\,DO_{11}\,\hat{}\,DO_{12}\,\hat{}\,DO_{13}\,\hat{}\,DO_{14}\,\hat{}\,DO_{15}$; and
$DOP_5 = DO_0\,\hat{}\,DO_1\,\hat{}\,DO_2\,\hat{}\,DO_3\,\hat{}\,DO_4\,\hat{}\,DO_5\,\hat{}\,DO_6\,\hat{}\,DO_7\,\hat{}\,DO_8\,\hat{}\,DO_9\,\hat{}\,DO_{10}\,\hat{}\,DO_{11}\,\hat{}\,DI_{12}\,\hat{}\,DI_{13}\,\hat{}\,DO_{14}\,\hat{}\,DO_{15}\,\hat{}\,DOP_0\,\hat{}\,DOP_1\,\hat{}\,DOP_2\,\hat{}\,DOP_3\,\hat{}\,DOP_4 = DO_0\,\hat{}\,DO_1\,\hat{}\,DO_2\,\hat{}\,DO_4\,\hat{}\,DO_7\,\hat{}\,DO_8\,\hat{}\,DO_{11}\,\hat{}\,DO_{13}\,\hat{}\,DO_{14}$.

In one embodiment, the multiplexer 441 passes the selected one of the input signal 301 (also known as SQ_DI [15:0]) or the output signal 319A (also referred to as NVM_DO[16:1]) to a first parity bit generation module 411, which generates 5 out of the 6 read or write parity bits that are used for performing error correction and/or error detection.

In one embodiment, the output of the first parity bit generation module 411 is provided, together with the selected one of the input signal 301 (also known as SQ_DI [15:0]) or the output signal 319A (also referred to as NVM_DO[16:1]), to an Exclusive-OR (XOR) digital logic gate. The output of this XOR digital logic gate is then provided to a second parity bit generation module 413. The second parity bit generation module 413 generates the $6^{th}$ read or write parity bit that is used for performing error correction and/or error detection.

The following Table 2 provides one embodiment of (i) generating the 6 write parity bits from 16 data bits encoded in the input signal 301 (also known as SQ_DI[15:0]); and (ii) combining the 6 write parity with the 16 bits encoded in the input signal 301 (also known as SQ_DI[15:0]) to form the 22 bits encoded in the processed signal 317A-B (also referred to as NVM_DI[22:1]).

TABLE 2

| 6 Parity Bits: NVM_DI[22:17], which includes: | 16 Data Bits: NVM_DI[16:1], which includes: |
|---|---|
| NVM_DI[22] = $p_5$, | NVM_DI[16] = SQ_DI[15] = $u_{15}$, |
| NVM_DI[21] = $p_4$, | NVM_DI[15] = SQ_DI[14] = $u_{14}$, |
| . . . | . . . |
| NVM_DI[17] = $p_0$. | NVM_DI[1] = SQ_DI[0] = $u_0$. |

| $p_5$ | $p_4$ | $p_3$ | $p_2$ | $p_1$ | $p_0$ | $u_{15}$ | $u_{14}$ | $u_{13}$ | $u_{12}$ | $u_{11}$ | $u_{10}$ | $u_9$ | $u_8$ | $u_7$ | $u_6$ | $u_5$ | $u_4$ | $u_3$ | $u_2$ | $u_1$ | $u_0$ | |
|---|---|---|---|---|---|---|---|---|---|---|---|---|---|---|---|---|---|---|---|---|---|---|
| | | | | | ✓ | x | | x | | x | | x | | x | | x | | x | | x | x | $p_0$ |
| | | | | ✓ | | x | x | | | x | x | | | x | x | | | x | x | | x | $p_1$ |

TABLE 2-continued

| 6 Parity Bits: NVM_DI[22:17], which includes: NVM_DI[22] = $p_5$, NVM_DI[21] = $p_4$, ... NVM_DI[17] = $p_0$. | 16 Data Bits: NVM_DI[16:1], which includes: NVM_DI[16] = SQ_DI[15] = $u_{15}$, NVM_DI[15] = SQ_DI[14] = $u_{14}$, ... NVM_DI[1] = SQ_DI[0] = $u_0$. |
|---|---|

| $p_5$ | $p_4$ | $p_3$ | $p_2$ | $p_1$ | $p_0$ | $u_{15}$ | $u_{14}$ | $u_{13}$ | $u_{12}$ | $u_{11}$ | $u_{10}$ | $u_9$ | $u_8$ | $u_7$ | $u_6$ | $u_5$ | $u_4$ | $u_3$ | $u_2$ | $u_1$ | $u_0$ | |
|---|---|---|---|---|---|---|---|---|---|---|---|---|---|---|---|---|---|---|---|---|---|---|
| | | | ✓ | | | x | x | x | x | | | | | x | x | x | x | | | | x | $p_2$ |
| | | ✓ | | | | x | x | x | x | x | x | x | x | | | | | | | | x | $p_3$ |
| | ✓ | | | | | x | x | x | x | x | x | x | x | x | x | x | x | x | x | x | | $p_4$ |
| ✓ | x | x | x | x | x | x | x | x | x | x | x | x | x | x | x | x | x | x | x | x | x | $p_5$ |

In Table 2, each check bit is the write parity bit with x's in the same row. For example, and in one embodiment:

$$p_0 = u_{15} \char`\^ u_{13} \char`\^ u_{11} \char`\^ u_9 \char`\^ u_7 \char`\^ u_5 \char`\^ u_3 \char`\^ u_1 \char`\^ u_0; \quad (1).$$

$$p_1 = u_{15} \char`\^ u_{14} \char`\^ u_{11} \char`\^ u_{10} \char`\^ u_7 \char`\^ u_6 \char`\^ u_3 \char`\^ u_2 \char`\^ u_0; \quad (2).$$

$$p_2 = u_{15} \char`\^ u_{14} \char`\^ u_{13} \char`\^ u_{12} \char`\^ u_7 \char`\^ u_6 \char`\^ u_5 \char`\^ u_4 \char`\^ u_0; \quad (3).$$

$$p_3 = u_{15} \char`\^ u_{14} \char`\^ u_{13} \char`\^ u_{12} \char`\^ u_{11} \char`\^ u_{10} \char`\^ u_9 \char`\^ u_8 \char`\^ u_0; \quad (4).$$

$$p_4 = u_{15} \char`\^ u_{13} \char`\^ u_{12} \char`\^ u_{11} \char`\^ u_{10} \char`\^ u_9 \char`\^ u_8 \char`\^ u_7 \char`\^ u_6 \char`\^ u_5 \char`\^ u_4 \char`\^ u_3 \char`\^ u_2 \char`\^ u_1;$$
and $\quad (5).$ $$p_5 = u_{15} \char`\^ u_{14} \char`\^ u_{13} \char`\^ u_{12} \char`\^ u_{11} \char`\^ u_{10} \char`\^ u_9 \char`\^ u_8 \char`\^ u_7 \char`\^ u_6 \char`\^ u_5 \char`\^ u_4 \char`\^ u_3 \char`\^ u_2 \char`\^ u_1 \char`\^ u_0 \char`\^ p_4 \char`\^ p_3 \char`\^ p_2 \char`\^ p_1 \char`\^ p_0.$$

In Table 2, please note that $p_5$ is the write parity bit for all of the 16 data bits encoded in the input signal 301 (also known as SQ_DI[15:0]) and for the other 5 write parity bits (i.e., $p_0$, $p_1$, $p_2$, $p_3$, and $p_4$).

In one embodiment, the 6 read or write parity bits are temporarily stored in storage module 417. In one embodiment, if the 6 parity bits are write parity bits, then they are subsequently stored in memory 223 as the processed signal 317B (also referred to as NVM_DI[22:17]). In one embodiment, if the 6 parity bits are read parity bits, then they are subsequently stored in memory 223 as the return signal 319B (also referred to herein as NVM_DO[22:17]).

In one embodiment, the 16 bits encoded in the input signal 301 (also known as SQ_DI[15:0]) are stored in memory 223 as the processed signal 317A (also referred to as NVM_DI[16:1]).

In one embodiment, the 5 read or write parity bits generated at module 411 are provided, together with 5 of the 6 parity bits of the return signal 319B (also referred to herein as NVM_DO[22:17]), as inputs of an XOR digital logic gate. The output of this XOR digital logic gate is then provided to a first syndrome bit generation module 423. In one embodiment, the module 423 is used to generate 5 out of 6 syndrome bits used by the ECC module 221 for at least one of error detection or error correction.

As used herein, syndrome bits are used to determine or index a position or number of one or more bit-flips in a 16-bit word.

In one embodiment, the 6$^{th}$ write parity bit generated at module 413 is provided, together with the 6$^{th}$ read parity bit of the return signal 319B (also referred to herein as NVM_DO[22:17]), as inputs of an XOR digital logic gate. The output of this XOR digital logic gate is then provided to a second syndrome bit generation module 415. In one embodiment, the module 415 is used to generate the 6$^{th}$ syndrome bit used by the ECC module 221 for at least one of error detection or error correction.

In one embodiment, the 6 write parity bits generated from the 16 data bits encoded in the input signal 301 (also known as SQ_DI[15:0]) are passed, together with the 6 read parity bits generated from the 16 data bits encoded in the output signal 319A (also referred to as NVM_DO[16:1]), as inputs to XOR digital logic gates. In one embodiment, the processing of the 6 read parity bits and the 6 write parity bits by these XOR digital logic gates results in the generation of 6 syndrome bits—$s_5$, $s_4$, $s_3$, $s_2$, $s_1$, $s_0$. In one embodiment, the 6 syndrome bits are used for at least one of (i) detecting single or multiple bit-flips in the 16 data bits or the 6 parity bits; or (ii) correcting a single bit-flip in the 16 data bits or the 6 parity bits.

With regard to the detection of single bit-flips in the 16 data bits, the following Pseudo-code 3 provides one embodiment of generating 6 syndrome bits (referred to in Pseudo-code 3 as $s_{0-5}$) based on the 6 read parity bits (referred to in Pseudo-code 3 as $DOP_{0-5}$), and the 6 write parity bits (referred to in Pseudo-code 3 as $DIP_{0-5}$), which are based on the 16 data bits (referred to in Pseudo-code 3 as $DO_{0-18}$) encoded in the output signal 319A (also referred to as NVM_DO[16:1]), the 16 data bits (referred to in Pseudo-code 3 as $DI_{0-18}$) encoded in the input signal 301 (also known as SQ_DI[15:0]).

Pseudo-Code 3:

$$s_0 = DIP_0 \char`\^ DOP_0 = (DI_0 \char`\^ DO_0) \char`\^ (DI_1 \char`\^ DO_1) \char`\^ (DI_3 \char`\^ DO_3) \char`\^$$
$$(DI_5 \char`\^ DO_5) \char`\^ (DI_7 \char`\^ DO_7) \char`\^ (DI_9 \char`\^ DO_9) \char`\^ (DI_{11} \char`\^ DO_{11}) \char`\^$$
$$(DI_{13} \char`\^ DO_{13}) \char`\^ (DI_{15} \char`\^ DO_{15}) \quad \text{(equation 1)}$$

$$s_1 = DIP_1 \char`\^ DOP_0 = (DI_0 \char`\^ DO_0) \char`\^ (DI_2 \char`\^ DO_2) \char`\^ (DI_3 \char`\^ DO_3) \char`\^$$
$$(DI_6 \char`\^ DO_6) \char`\^ (DI_7 \char`\^ DO_7) \char`\^ (DI_{10} \char`\^ DO_{10}) \char`\^ (DI_{11} \char`\^ DO_{11})$$
$$\char`\^ (DI_{14} \char`\^ DO_{14}) \char`\^ (DI_{15} \char`\^ DO_{15}) \quad \text{(equation 2)}$$

$$s_2 = DIP_2 \char`\^ DOP_2 = (DI_0 \char`\^ DO_0) \char`\^ (DI_4 \char`\^ DO_4) \char`\^ (DI_5 \char`\^ DO_5) \char`\^$$
$$(DI_6 \char`\^ DO_6) \char`\^ (DI_7 \char`\^ DO_7) \char`\^ (DI_{12} \char`\^ DO_{12}) \char`\^ (DI_{13} \char`\^ DO_{13})$$
$$\char`\^ (DI_{14} \char`\^ DO_{14}) \char`\^ (DI_{15} \char`\^ DO_{15}) \quad \text{(equation 3)}$$

$$s_3 = DIP_3 \char`\^ DOP_3 = (DI_0 \char`\^ DO_0) \char`\^ (DI_8 \char`\^ DO_8) \char`\^ (DI_9 \char`\^ DO_9) \char`\^$$
$$(DI_{10} \char`\^ DO_{10}) \char`\^ (DI_{11} \char`\^ DO_{11}) \char`\^ (DI_{12} \char`\^ DO_{12}) \char`\^$$
$$(DI_{13} \char`\^ DO_{13}) \char`\^ (DI_{14} \char`\^ DO_{14}) \char`\^ (DI_{15} \char`\^ DO_{15}) \quad \text{(equation 4)}$$

$$s_4 = DIP_4 \char`\^ DOP_4 = (DI_1 \char`\^ DO_1) \char`\^ (DI_2 \char`\^ DO_2) \char`\^ (DI_3 \char`\^ DO_3) \char`\^$$
$$(DI_4 \char`\^ DO_4) \char`\^ (DI_5 \char`\^ DO_5) \char`\^ (DI_6 \char`\^ DO_6) \char`\^ (DI_7 \char`\^ DO_7) \char`\^$$
$$(DI_8 \char`\^ DO_8) \char`\^ (DI_9 \char`\^ DO_9) \char`\^ (DI_{10} \char`\^ DO_{10}) \char`\^ (DI_{11} \char`\^ DO_{11})$$
$$\char`\^ (DI_{12} \char`\^ DO_{12}) \char`\^ (DI_{13} \char`\^ DO_{13}) \char`\^ (DI_{14} \char`\^ DO_{14}) \char`\^$$
$$(DI_{15} \char`\^ DO_{15}) \quad \text{(equation 5)}$$

$$s_5 = DIP_5 \char`\^ DOP_5 = (DI_0 \char`\^ DO_0) \char`\^ (DI_1 \char`\^ DO_1) \char`\^ (DI_2 \char`\^ DO_2) \char`\^$$
$$(DI_4 \char`\^ DO_4) \char`\^ (DI_7 \char`\^ DO_7) \char`\^ (DI_8 \char`\^ DO_8) \char`\^ (DI_{11} \char`\^ DO_{11}) \char`\^$$
$$(DI_{13} \char`\^ DO_{13}) \char`\^ (DI_{14} \char`\^ DO_{14}) \quad \text{(equation 6)}$$

In Pseudo-code 3, and in one embodiment, the 6 syndrome bits (referred to in Pseudo-code 3 as $s_{0-5}$) are used for determining a single bit-flip in the 16 data bits being requested from memory 233 of FIG. 2. In FIG. 4, the operations performed by Pseudo-code 3 occur at module 425. Moreover, in Pseudo-code 3, if there is an error, i.e. $DI_x$ is not equal to $DO_x$, then $DI_x \wedge DO_x = 1$; otherwise $DI_x \wedge DO_x = 0$. Thus, the 6 syndrome bits of Pseudo-code 3 can detect the differences between the 16 data bits encoded in the output signal 319A (also referred to as NVM_DO[16:1]) and the 16 data bits (referred to in Pseudo-code 3 as $DI_{0-15}$) encoded in the input signal 301 (also known as SQ_DI[15:0]). Furthermore, each single bit-flip that inflicts the different ones of the 16 bits produces a unique syndrome pattern. This is because of the arrangement of the parity bits generation results. Therefore, the 6 syndrome bits of Pseudo-code 3 can be used to determine or index the location of the single bit-flip. In one embodiment, once the location of the single bit-flip is identified, the error is corrected by reversing or "flipping" the erroneous bit back to its proper value, which is the reverse of the inflicted one of the 16 data bits (referred to in Pseudo-code 3 as $DO_{0-15}$) encoded in the output signal 319A (also referred to as NVM_DO[16:1]).

The following Table 3a illustrates one embodiment of indexing a single bit-flip for each of the 16 data bits (referred to in Table 3a as $D_{0-15}$) using the 6 syndrome bits (referred to in Table 3a as $s_{0-5}$).

embodiment of generating 6 syndrome bits (referred to in Pseudo-code 4 as $s_{0-5}$) based on the 6 read parity bits (referred to in Pseudo-code 4 as $DOP_{0-5}$), and the 6 write parity bits (referred to in Pseudo-code 4 as $DIP_{0-5}$), which are based on the 16 data bits (referred to in Pseudo-code 4 as $DO_{0-15}$) encoded in the output signal 319A (also referred to as NVM_DO[16:1]), the 16 data bits (referred to in Pseudo-code 4 as $DI_{0-15}$) encoded in the input signal 301 (also known as SQ_DI[15:0]).

Pseudo-Code 4:

$$s_0 = DIP_0 \wedge DOP_0 \quad \text{(equation 7)}$$

$$s_1 = DIP_1 \wedge DOP_1 \quad \text{(equation 8)}$$

$$s_2 = DIP_2 \wedge DOP_2 \quad \text{(equation 9)}$$

$$s_3 = DIP_3 \wedge DOP_3 \quad \text{(equation 10)}$$

$$s_4 = DIP_4 \wedge DOP_4 \quad \text{(equation 11)}$$

$$s_5 = DIP_5 \wedge DOP_5 \quad \text{(equation 12)}$$

In Pseudo-code 4, the 6 read parity bits (referred to as $DOP_{0-5}$) are the data read from the return signal 319B (also TABLE 3a

| $s_5$ | $s_4$ | $s_3$ | $s_2$ | $s_1$ | $s_0$ | $D_{15}$ | $D_{14}$ | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ |
|---|---|---|---|---|---|---|---|---|---|---|---|---|---|---|---|---|---|---|---|---|---|
| 1 | 0 | 1 | 1 | 1 | 1 |   |   |   |   |   |   |   |   |   |   |   |   |   |   |   | x |
| 1 | 1 | 0 | 0 | 0 | 1 |   |   |   |   |   |   |   |   |   |   |   |   |   |   | x |   |
| 1 | 1 | 0 | 0 | 1 | 0 |   |   |   |   |   |   |   |   |   |   |   |   |   | x |   |   |
| 0 | 1 | 0 | 0 | 1 | 1 |   |   |   |   |   |   |   |   |   |   |   |   | x |   |   |   |
| 1 | 1 | 0 | 1 | 0 | 0 |   |   |   |   |   |   |   |   |   |   |   | x |   |   |   |   |
| 0 | 1 | 0 | 1 | 0 | 1 |   |   |   |   |   |   |   |   |   |   | x |   |   |   |   |   |
| 0 | 1 | 0 | 1 | 1 | 0 |   |   |   |   |   |   |   |   |   | x |   |   |   |   |   |   |
| 1 | 1 | 0 | 1 | 1 | 1 |   |   |   |   |   |   |   |   | x |   |   |   |   |   |   |   |
| 1 | 1 | 1 | 0 | 0 | 0 |   |   |   |   |   |   |   | x |   |   |   |   |   |   |   |   |
| 0 | 1 | 1 | 0 | 0 | 1 |   |   |   |   |   |   | x |   |   |   |   |   |   |   |   |   |
| 0 | 1 | 1 | 0 | 1 | 0 |   |   |   |   |   | x |   |   |   |   |   |   |   |   |   |   |
| 1 | 1 | 1 | 0 | 1 | 1 |   |   |   |   | x |   |   |   |   |   |   |   |   |   |   |   |
| 0 | 1 | 1 | 1 | 0 | 0 |   |   |   | x |   |   |   |   |   |   |   |   |   |   |   |   |
| 1 | 1 | 1 | 1 | 0 | 1 |   |   | x |   |   |   |   |   |   |   |   |   |   |   |   |   |
| 1 | 1 | 1 | 1 | 1 | 0 |   | x |   |   |   |   |   |   |   |   |   |   |   |   |   |   |
| 0 | 1 | 1 | 1 | 1 | 1 | x |   |   |   |   |   |   |   |   |   |   |   |   |   |   |   |

In Table 3a, the binary word formed by the 6 syndrome bits specifies the exact location of the single bit-flip in the 16 data bits. The inflicted bit is denoted in Table 3a using the "x" symbol.

In one embodiment, the 6 syndrome bits are temporarily stored in storage module 419. In one embodiment, the processed signal 319A (also referred to as NVM_DO[16:1]) is provided, together with 6 syndrome bits temporarily stored in module 419, as inputs of a module 425. In one embodiment, the 6 syndrome bits are used to index or determine a single bit-flip at module 425A. In one embodiment, the indexed or determined single bit-flip is inverted by the inverter 425B to flip the corrupted bit back to its appropriate value. In this way, the 16 data bits encoded in the output signal 319A (also referred to as NVM_DO[16:1]) originating from memory 223 are corrected and provided as the output signal 303 (also referred to as SQ_DO[15:0]). In one embodiment, following the correction of the single bit-flip, the input signal (also referred to as SQ_DI [15:0]) is equal to the output signal 303 (also referred to as SQ_DO [15:0]). In one embodiment, the output signal 303 (also referred to as SQ_DO[15:0]) is provided to reader 105 following the correction of the single bit-flip.

With regard to the detection of single bit-flips in the 6 parity bits, the following Pseudo-code 4 provides one referred to herein as NVM_DO[22:17]). Pseudo-code 4 assumes that there is no error in 16 data bits. Under this assumption, where there are no errors in the 16 data bits, then the right-hand side of equations (1-6) of the Pseudo-code 3 should all be equal to 0. This is because $DI_x$ should be equal to $DO_x$ for x=0, 1, 2 ... 15. An error (single bit-flip) will be detected with 6 read or write parity bits when one of the 6 syndrome bits (referred to as $s_{0-6}$) is not be equal to zero. This is because one of the 6 write parity bits (referred to as $DIP_x$) will not be equal to a corresponding one of the 6 read parity bits (referred to as $DOP_x$), for x=0, 1, 2 ... 15. Equations 7-12 of Pseudo-code 4 show how a comparison between the 6 write parity bits (referred to as $DIP_x$) and the corresponding 6 read parity bits (referred to as $DOP_x$) is performed.

In one embodiment, the detection of a single bit-flip with the 6 read or write parity bits is not corrected as it has no effect the 16 bits of data being requested from memory 223 of FIG. 2. The following Table 3b illustrates one embodiment of indexing a single bit-flip for each of the 6 read or write parity bits (referred to in Table 3b as $p_{0-5}$) using the 6 syndrome bits (referred to in Table 3b as $s_{0-5}$).

TABLE 3b

| $s_5$ | $s_4$ | $s_3$ | $s_2$ | $s_1$ | $s_0$ | $p_5$ | $p_4$ | $p_3$ | $p_2$ | $p_1$ | $p_0$ |
|---|---|---|---|---|---|---|---|---|---|---|---|
| 0 | 0 | 0 | 0 | 0 | 1 |   |   |   |   |   | x |
| 0 | 0 | 0 | 0 | 1 | 0 |   |   |   |   | x |   |
| 0 | 0 | 0 | 1 | 0 | 0 |   |   |   | x |   |   |
| 0 | 0 | 1 | 0 | 0 | 0 |   |   | x |   |   |   |
| 0 | 1 | 0 | 0 | 0 | 0 |   | x |   |   |   |   |
| 1 | 0 | 0 | 0 | 0 | 0 | x |   |   |   |   |   |

In Table 3b, the binary word formed by the 6 syndrome bits specifies the exact location of the single bit-flip in the 6 read or write parity bits. The inflicted bit is denoted in Table 3b using the "x" symbol.

The following Table 4 illustrates one embodiment of (i) indexing a single bit-flip for each of the 6 read or write parity bit (referred to in Table 4 as $p_{0-5}$) and for each of the 16 data bits (referred to in Table 4 as $u_{0-15}$) using the 6 syndrome bits (referred to in Table 4 as $s_{0-5}$); and (ii) correcting the detected single bit-flips in the 16 data bits (referred to in Table 4 as $u_{0-15}$).

TABLE 4

| Data Bits ($u_{0-15}$) or Parity Bit ($p_{0-5}$) inflicted with an Error (where the Error is a single bit-flip) | Six-bit word formed from six syndrome bits ($s_{0-5}$): Six-bit word format is $s_5\,s_4\,s_3\,s_2\,s_1\,s_0$ | Error Correction |
|---|---|---|
| $u_0$ | 101111 | Data Error detected and |
| $u_1$ | 110001 | corrected in SQ_DO[15:0]. |
| $u_2$ | 110010 | The position of Error Bit |
| $u_3$ | 010011 | is indexed by 5 of the 6 |
| $u_4$ | 110100 | syndrome bits. i.e., |
| $u_5$ | 010101 | $s_4\,s_3\,s_2\,s_1\,s_0$. In this |
| $u_6$ | 010110 | case, the 6$^{th}$ syndrome bit |
| $u_7$ | 110111 | ($s_5$) is not used. |
| $u_8$ | 111000 |   |
| $u_9$ | 011001 |   |
| $u_{10}$ | 011010 |   |
| $u_{11}$ | 111011 |   |
| $u_{12}$ | 011100 |   |
| $u_{13}$ | 111101 |   |
| $u_{14}$ | 111110 |   |
| $u_{15}$ | 011111 |   |
| $p_0$ | 000001 | Parity Error detected but |
| $p_1$ | 000010 | ignored as it has no effect |
| $p_2$ | 000100 | on data SQ_DO[15:0]. |
| $p_3$ | 001000 |   |
| $p_4$ | 010000 |   |
| $p_5$ | 100000 |   |

Table 4 indicates one embodiment of how a tag's IC (e.g., one or more of the tags discussed above in at least one of FIGS. 1-4) can combine single bit-flip detection and correction for the 16 data bits requested from a tag's memory (e.g., memory found in one or more of the tags discussed above in at least one of FIGS. 1-4).

In one embodiment, the 6 syndrome bits generated and temporarily stored in module 419 can also be used to detect multiple bit-flips, which are defined above. In one embodiment, the detection of multiple bit-flips by the ECC module 221 of FIG. 3 is based on the property that multiple bit-flips (referred to also as multiple error syndromes) are different from single bit-flips (referred to also as single error syndromes). Hence, given a non-zero syndrome, the ECC module 221 of FIG. 3 can indicate whether it is caused by either a single bit-flip or multiple bit-flips without ambiguity.

For the sake of brevity and clarity, the description provided herein uses a double bit-flip (two erroneous bits in a stored byte or word) as an example of multiple bit-flips. It is to be appreciated that multiple bit-flips also encompass triple or more bit-flips. The description provided herein focuses on double bit-flips because bit-flips affecting three or more bits of a byte or word tend to generate the same arrangement of the 6 syndrome bits as single or double bit-flips. Thus, in one embodiment, the ECC module 221 of FIG. 3 only indicates that a particular type of multiple bit-flip affects three or more bits of a stored byte or word without specifying the exact number of affected bits.

In one embodiment, the ECC module 221 of FIG. 3 uses only 5 of the 6 syndrome bits (also referred to as $s_{4-0}$) to index a single bit-flip. In this embodiment, the ECC module 221 of FIG. 3 ignores the 6$^{th}$ syndrome bit (also referred to as $s_5$) and treats the 6$^{th}$ syndrome bit (also referred to as $s_5$) as if the non-zero syndrome were always caused by a single bit-flip. In a further embodiment that is based on the preceding embodiment, when a double bit-flip occurs, the ECC module 221 of FIG. 3 will still correct the 16 data bits according to 5 of the 6 syndrome bits (also referred to as $s_{4-0}$). As a first example, a word "101111" suffers from a single bit-flip at "0." In this first example, the single bit-flip will be detected and corrected and the resulting word will be "111111." As a second example, a word "001111" suffers from a double bit-flip that affects "0" and "0." In this second example, at least one of the inflicted bits will be flipped as a detected single bit-flip, however, this corrected data will be unrecognizable from the correct data because of the double bit-flip.

In one embodiment, the ECC module 221 of FIG. 3 uses all 6 syndrome bits (also referred to as $s_{5-0}$) to index single bit-flips and multiple bit-flips (e.g., a double bit-flip). In this embodiment, the ECC module 221 of FIG. 3 only corrects a detected single bit-flip. In a further embodiment that is based on the preceding embodiment, when a double bit-flip occurs, the ECC module 221 of FIG. 3 will pass the corrupted data together with an indication that the corrupted data suffers from a multiple bit-flip. As a first example, a word "101111" suffers from a single bit-flip at "0." In this first example, the single bit-flip will be detected and corrected and the resulting word will be "111111." As a second example, a word "001111" suffers from a double bit-flip that affects "0" and "0." In this second example, none of the inflicted bits will be flipped, however, this corrupted data which is unrecognizable from the correct data because of the double bit-flip, will be passed to a reader 105 together with an indication that the corrupted data is inflicted with a multiple bit-flip.

In one embodiment, a multiple bit-flip includes at least one of (i) multiple bit-flips affecting the 16 data bits; (ii) multiple bit-flips affecting the 6 read or write parity bits; (iii) a single bit-flip affecting the 16 data bits together with a single bit-flip affecting the 6 read or write parity bits; (iv) a single bit-flip affecting the 16 data bits together with multiple bit-flips affecting the 6 read or write parity bits; or (v) multiple bit-flips affecting the 16 data bits together with a single bit-flip affecting the 6 read or write parity bits. For example, and in one embodiment, double bit-flips include at least one of (i) a double bit-flip affecting the 16 data bits; (ii) a double bit-flip affecting the 6 read or write parity bits; or (ii) a single bit-flip affecting the 16 data bits together with a single bit-flip affecting the 6 read or write parity bits.

The following Table 5 illustrates one embodiment of (i) indexing a multiple bit-flip detection on the 16 data bits (referred to in Table 5 as u[15:0]) and the 6 parity bits (referenced in Table 5 as u[21:16]) using the 6 syndrome bits (referred to in Table 5 as $s_{0-5}$).

In Table 5, the affected bits are indicated in brackets. For example, in the second row (immediately after the row with the labels), the "(1, 2)" indicates that bit 1 and bit 2 of the 16 data bits are inflicted with a double bit-flip.

TABLE 5

| Six-bit word formed from six syndrome bits ($s_{0-5}$): Six-bit word format is $s_5 s_4 s_3 s_2 s_1 s_0$ | Data Bits (u[15:0]) or Parity Bit (u[21:16])) inflicted with an Error (where the Error is a multiple bit-flip) |
|---|---|
| 000011 | (1, 2); (3, 20); (4, 7); (5, 6); (8, 11); (9, 10); (12, 15); (13, 14); or (16, 17) |
| 000101 | (1, 4); (2, 7); (3, 6); (5, 20); (8, 13); (9, 12); (10, 15); (11, 14); or (16, 18) |
| 000110 | (1, 7); (2, 4); (3, 5); (6, 20); (8, 14); (9, 15); (10, 12); (11, 13); or (17, 18) |
| 000111 | Triple or more bit-flips only |
| 001001 | (1, 8); (2, 11); (3, 10); (4, 13); (5, 12); (6, 15); (7, 14); (9, 20); or (16, 19) |
| 001010 | (1, 11); (2, 8); (3, 9); (4, 14); (5, 15); (6, 12); (7, 13); (10, 20); or (17, 19) |
| 001011 | Triple or more bit-flips only |
| 001100 | (1, 13); (2, 14); (3, 15); (4, 8); (5, 9); (6, 10); (12, 20); or (18, 19) |
| 001101 | Triple or more bit-flips only |
| 001110 | Triple or more bit-flips only |
| 001111 | (0, 21); (1, 14); (2, 13); (3, 12); (4, 11); (5, 10); (6, 9); (7, 8); or (15, 20) |
| 010001 | (0, 14); (1, 21); (3, 17); (5, 18); (9, 19); or (16, 20) |
| 010010 | (0, 13); (2, 21); (3, 16); (6, 18); (10, 19); or (17, 20) |
| 010100 | (0, 11); (4, 21); (5, 16); (6, 17); (12, 19); or (18, 20) |
| 010111 | (0, 8); (3, 18); (5, 17); (6, 16); (7, 21); or (15, 19) |
| 011000 | (0, 7); (8, 21); (9, 16); (10, 17); (12, 18); or (19, 20) |
| 011011 | (0, 4); (3, 19); (9, 17); (10, 16); (11, 21); or (15, 18) |
| 011101 | (0, 2); (5, 19); (9, 18); (12, 16); (13, 21); or (15, 17) |
| 011110 | (0, 1); (6, 19); (10, 18); (12, 17); (14, 21); or (15, 16) |
| 100001 | (1, 20); (2, 3); (4, 5); (6, 7); (8, 9); (10, 11); (12, 13); (14, 15); or (16, 21) |
| 100010 | (1, 3); (2, 20); (4, 6); (5, 7); (8, 10); (9, 11); (12, 14); (13, 15); or (17, 21) |
| 100011 | Triple or more bit-flips only |
| 100100 | (1, 5); (2, 6); (3, 7); (4, 20); (8, 12); (9, 13); (10, 14); (11, 15); or (18, 21) |
| 100101 | Triple or more bit-flips only |
| 100110 | Triple or more bit-flips only |
| 100111 | (0, 19); (1, 6); (2, 5); (3, 4); (7, 20); (8, 15); (9, 14); (10, 13); or (11, 12) |
| 101000 | (1, 9); (2, 10); (3, 11); (4, 12); (5, 13); (6, 14); (7, 15); (8, 20); or (19, 21) |
| 101001 | Triple or more bit-flips only |
| 101010 | Triple or more bit-flips only |
| 101011 | (0, 18); (1, 10); (2, 9); (3, 8); (4, 15); (5, 14); (6, 13); (7, 12); or (11, 20) |
| 101100 | Triple or more bit-flips only |
| 101101 | (0, 17); (1, 12); (2, 15); (3, 14); (4, 9); (6, 8); (6, 11); (7, 10); or (13, 20) |
| 101110 | (0, 16); (1, 15); (2, 12); (3, 13); (4, 10); (5, 11); (6, 8); (7, 9); or (14, 20) |
| 110000 | (0, 15); (1, 16); (2, 17); (4, 18); (8, 19); or (20, 21) |
| 110011 | (0, 12); (1, 17); (2, 16); (3, 21); (7, 18); or (11, 19) |
| 110101 | (0, 10); (1, 18); (4, 16); (5, 21); (7, 17); or (13, 19) |
| 110110 | (0, 9); (2, 18); (4, 17); (6, 21); (7, 16); or (14, 19) |
| 111001 | (0, 6); (1, 19); (8, 16); (9, 21); (11, 17); or (13, 18) |
| 111010 | (0, 5); (2, 19); (8, 17); (10, 21); (11, 16); or (14, 18) |
| 111100 | (0, 3); (4, 19); (8, 18); (12, 21); (13, 16); or (14, 17) |
| 111111 | (0, 20); (7, 19); (11, 18); (13, 17); (14, 16); or (15, 21) |

The following Table 6 illustrates one embodiment of (i) indexing a single bit-flip and multiple bit-flips for each of the 16 data bits and the 6 parity bits (referred to in Table 5 as u[21:0]) using the 6 syndrome bits (referred to in Table 6 as $s_{0-5}$); (ii) correcting the detected single bit-flips in the 16 data bits (referred to in Table 5 as u[15:0]); and (iii) ignoring the detected single bit-flips in the 6 parity bits (referred to in Table 5 as u[21:16]). In Table 6, the 6 parity bits are also referred to as $p_{0-5}$. In Table 6, the affected bits are indicated in brackets. As a first example, in the fourth row (immediately after the row with the labels), the "(1, 2)" indicates that bit 1 and bit 2 of the 16 data bits are inflicted with a double bit-flip. As a second example, in the third row (immediately after the row with the labels), the "(17) or $p_1$" indicates that an error was detected with bit 2 of the 6 parity bits.

TABLE 6

| Six-bit word formed from six syndrome bits ($s_{0-5}$): Six-bit word format is $s_5 s_4 s_3 s_2 s_1 s_0$ | Data Bits (u[15:0]) or Parity Bit (u[21:16]) inflicted with an Error (where the Error is a single bit-flip or a multiple bit-flip) Note: u[21:0] is mapped to NVM_DO[22:1] | SQ_DO[15:0] Note: If no data bit error is detected or if parity bit error is ignored, then SQ_DO[15:0] = NVM_DO[16:1]; and if error is a single bit-flip affecting one of the 16 data bits, then corresponding erroneous data bit of SQ_DO[15:0] or NVM_DO[16:1] is corrected. |
|---|---|---|
| 000000 | None | NVM_DO[16:1] - No error detected |
| 000001 | (16) or $p_0$ | NVM_DO[16:1] - Single bit-flip affecting parity bit is ignored. |
| 000010 | (17) or $p_1$ | NVM_DO[16:1] - Single bit-flip affecting parity bit is ignored. |
| 000011 | (1, 2); (3, 20); (4, 7); (5, 6); (8, 11); (9, 10); (12, 15); (13, 14); or (16, 17) | Corrupted data is detected but not corrected. |
| 000100 | (18) or $p_2$ | NVM_DO[16:1] - Single bit-flip affecting parity bit is ignored. |
| 000101 | (1, 4); (2, 7); (3, 6); (5, 20); (8, 13); (9, 12); (10, 15); (11, 14); or (16, 18) | Corrupted data is detected but not corrected. |

TABLE 6-continued

| Six-bit word formed from six syndrome bits ($s_{0-5}$): Six-bit word format is $s_5 s_4 s_3 s_2 s_1 s_0$ | Data Bits (u[15:0]) or Parity Bit (u[21:16]) inflicted with an Error (where the Error is a single bit-flip or a multiple bit-flip) Note: u[21:0] is mapped to NVM_DO[22:1] | SQ_DO[15:0] Note: If no data bit error is detected or if parity bit error is ignored, then SQ_DO[15:0] = NVM_DO[16:1]; and if error is a single bit-flip affecting one of the 16 data bits, then corresponding erroneous data bit of SQ_DO[15:0] or NVM_DO[16:1] is corrected. |
|---|---|---|
| 000110 | (1, 7); (2, 4); (3, 5); (6, 20); (8, 14); (9, 15); (10, 12); (11, 13); or (17, 18) | Corrupted data is detected but not corrected. |
| 000111 | Triple or more bit-flips only | Corrupted data is detected but not corrected. |
| 001000 | (19) or $p_3$ | NVM_DO[16:1] - Single bit-flip affecting parity bit is ignored. |
| 001001 | (1, 8); (2, 11); (3, 10); (4, 13); (5, 12); (6, 15); (7, 14); (9, 20); or (16, 19) | Corrupted data is detected but not corrected. |
| 001010 | (1, 11); (2, 8); (3, 9); (4, 14); (5, 15); (6, 12); (7, 13); (10, 20); or (17, 19) | Corrupted data is detected but not corrected. |
| 001011 | Triple or more bit-flips only | Corrupted data is detected but not corrected. |
| 001100 | (1, 13); (2, 14); (3, 15); (4, 8); (5, 9); (6, 10); (12, 20); or (18, 19) | Corrupted data is detected but not corrected. |
| 001101 | Triple or more bit-flips only | Corrupted data is detected but not corrected. |
| 001110 | Triple or more bit-flips only | Corrupted data is detected but not corrected. |
| 001111 | (0, 21); (1, 14); (2, 13); (3, 12); (4, 11); (5, 10); (6, 9); (7, 8); or (15, 20) | Corrupted data is detected but not corrected. |
| 010000 | (20) or $p_4$ | NVM_DO[16:1] - Single bit-flip affecting parity bit is ignored. |
| 010001 | (0, 14); (1, 21); (3, 17); (5, 18); (9, 19); or (16, 20) | Corrupted data is detected but not corrected. |
| 010010 | (0, 13); (2, 21); (3, 16); (6, 18); (10, 19); or (17, 20) | Corrupted data is detected but not corrected. |
| 010011 | (3) | NVM_DO[16:1] - Single bit-flip affecting fourth bit of 16 data bits is corrected. |
| 010100 | (0, 11); (4, 21); (5, 16); (6, 17); (12, 19); or (18, 20) | Corrupted data is detected but not corrected. |
| 010101 | (5) | NVM_DO[16:1] - Single bit-flip affecting sixth bit of 16 data bits is corrected. |
| 010110 | (6) | NVM_DO[16:1] - Single bit-flip affecting seventh bit of 16 data bits is corrected. |
| 010111 | (0, 8); (3, 18); (5, 17); (6, 16); (7, 21); or (15, 19) | Corrupted data is detected but not corrected. |
| 011000 | (0, 7); (8, 21); (9, 16); (10, 17); (12, 18); or (19, 20) | Corrupted data is detected but not corrected. |
| 011001 | (9) | NVM_DO[16:1] - Single bit-flip affecting tenth bit of 16 data bits is corrected. |
| 011010 | (10) | NVM_DO[16:1] - Single bit-flip affecting eleventh bit of 16 data bits is corrected. |
| 011011 | (0, 4); (3, 19); (9, 17); (10, 16); (11, 21); or (15, 18) | Corrupted data is detected but not corrected. |
| 011100 | (12) | NVM_DO[16:1] - Single bit-flip affecting thirteenth bit of 16 data bits is corrected. |
| 011101 | (0, 2); (5, 19); (9, 18); (12, 16); (13, 21); or (15, 17) | Corrupted data is detected but not corrected. |
| 011110 | (0, 1); (6, 19); (10, 18); (12, 17); (14, 21); or (15, 16) | Corrupted data is detected but not corrected. |
| 011111 | (15) | NVM_DO[16:1] - Single bit-flip affecting bit sixteenth bit of 16 data bits is corrected. |
| 100000 | (21) or $p_4$ | NVM_DO[16:1] - Single bit-flip affecting parity bit is ignored. |
| 100001 | (1, 20); (2, 3); (4, 5); (6, 7); (8, 9); (10, 11); (12, 13); (14, 15); or (16, 21) | Corrupted data is detected but not corrected. |
| 100010 | (1, 3); (2, 20); (4, 6); (5, 7); (8, 10); (9, 11); (12, 14); (13, 15); or (17, 21) | Corrupted data is detected but not corrected. |
| 100011 | Triple or more bit-flips only | Corrupted data is detected but not corrected. |
| 100100 | (1, 5); (2, 6); (3, 7); (4, 20); (8, 12); (9, 13); (10, 14); (11, 15); or (18, 21) | Corrupted data is detected but not corrected. |
| 100101 | Triple or more bit-flips only | Corrupted data is detected but not corrected. |
| 100110 | Triple or more bit-flips only | Corrupted data is detected but not corrected. |
| 100111 | (0, 19); (1, 6); (2, 5); (3, 4); (7, 20); (8, 15); (9, 14); (10, 13); or (11, 12) | Corrupted data is detected but not corrected. |
| 101000 | (1, 9); (2, 10); (3, 11); (4, 12); (5, 13); (6, 14); (7, 15); (8, 20); or (19, 21) | Corrupted data is detected but not corrected. |
| 101001 | Triple or more bit-flips only | Corrupted data is detected but not corrected. |
| 101010 | Triple or more bit-flips only | Corrupted data is detected but not corrected. |

TABLE 6-continued

| Six-bit word formed from six syndrome bits ($s_{0-5}$): Six-bit word format is $s_5 s_4 s_3 s_2 s_1 s_0$ | Data Bits (u[15:0]) or Parity Bit (u[21:16]) inflicted with an Error (where the Error is a single bit-flip or a multiple bit-flip) Note: u[21:0] is mapped to NVM_DO[22:1] | SQ_DO[15:0] Note: If no data bit error is detected or if parity bit error is ignored, then SQ_DO[15:0] = NVM_DO[16:1]; and if error is a single bit-flip affecting one of the 16 data bits, then corresponding erroneous data bit of SQ_DO[15:0] or NVM_DO[16:1] is corrected. |
|---|---|---|
| 101011 | (0, 18); (1, 10); (2, 9); (3, 8); (4, 15); (5, 14); (6, 13); (7, 12); or (11, 20) | Corrupted data is detected but not corrected. |
| 101100 | Triple or more bit-flips only | Corrupted data is detected but not corrected. |
| 101101 | (0, 17); (1, 12); (2, 15); (3, 14); (4, 9); (6, 8); (6, 11); (7, 10); or (13, 20) | Corrupted data is detected but not corrected. |
| 101110 | (0, 16); (1, 15); (2, 12); (3, 13); (4, 10); (5, 11); (6, 8); (7, 9); or (14, 20) | Corrupted data is detected but not corrected. |
| 101111 | (0) | NVM_DO[16:1] - Single bit-flip affecting first bit of 16 data bits is corrected. |
| 110000 | (0, 15); (1, 16); (2, 17); (4, 18); (8, 19); or (20, 21) | Corrupted data is detected but not corrected. |
| 110001 | (1) | NVM_DO[16:1] - Single bit-flip affecting second bit of 16 data bits is corrected. |
| 110010 | (2) | NVM_DO[16:1] - Single bit-flip affecting third bit of 16 data bits is corrected. |
| 110011 | (0, 12); (1, 17); (2, 16); (3, 21); (7, 18); or (11, 19) | Corrupted data is detected but not corrected. |
| 110100 | (4) | NVM_DO[16:1] - Single bit-flip affecting fifth bit of 16 data bits is corrected. |
| 110101 | (0, 10); (1, 18); (4, 16); (5, 21); (7, 17); or (13, 19) | Corrupted data is detected but not corrected. |
| 110110 | (0, 9); (2, 18); (4, 17); (6, 21); (7, 16); or (14, 19) | Corrupted data is detected but not corrected. |
| 110111 | (7) | NVM_DO[16:1] - Single bit-flip affecting eighth bit of 16 data bits is corrected. |
| 111000 | (8) | NVM_DO[16:1] - Single bit-flip affecting ninth bit of 16 data bits is corrected. |
| 111001 | (0, 6); (1, 19); (8, 16); (9, 21); (11, 17); or (13, 18) | Corrupted data is detected but not corrected. |
| 111010 | (0, 5); (2, 19); (8, 17); (10, 21); (11, 16); or (14, 18) | Corrupted data is detected but not corrected. |
| 111011 | (11) | NVM_DO[16:1] - Single bit-flip affecting twelfth bit of 16 data bits is corrected. |
| 111100 | (0, 3); (4, 19); (8, 18); (12, 21); (13, 16); or (14, 17) | Corrupted data is detected but not corrected. |
| 111101 | (13) | NVM_DO[16:1] - Single bit-flip affecting fourteenth bit of 16 data bits is corrected. |
| 111110 | (14) | NVM_DO[16:1] - Single bit-flip affecting fifteenth bit of 16 data bits is corrected. |
| 111111 | (0, 20); (7, 19); (11, 18); (13, 17); (14, 16); or (15, 21) | Corrupted data is detected but not corrected. |

Table 6 indicates one embodiment of how a tag's IC (e.g., one or more of the tags discussed above in at least one of FIGS. 1-4) can combine single bit-flip detection, single bit-flip correction, and multiple bit-flip detection for the 16 data bits encoded in the output signal 319A-B (also referred to as NVM_DO[22:1]) that are requested from a tag's memory (e.g., memory found in one or more of the tags discussed above in at least one of FIGS. 1-4).

In Table 6, and in one embodiment, certain predetermined six-bit words formed from the six syndrome bits (also referred to $S_{5-0}$) are used to index or determine at least one of (i) whether a bit-flip is a single bit-flip that affects the 16 data bits and can be corrected; (ii) whether a bit-flip is a single bit-flip that affects the 6 read or write parity bits and will be ignored; (iii) whether a bit-flip is a multiple bit-flip that can be used to issue an indication that the corrupted data suffers from a multiple bit-flip; (iv) whether no error has been detected. In a first example, and in one embodiment, Table 4 shows that a list of predetermined six-bits words formed from the six syndrome bits (also referred to $S_{5-0}$) that indicate (i) detected single bit-flips affecting the 16 data bits that have been corrected; and (ii) detected single bit-flips affecting the 6 read or write parity bits that have been ignored. In a second example, and in one embodiment, Table 5 shows that a list of predetermined six-bits words formed from the six syndrome bits (also referred to $S_{5-0}$) that indicate detected multiple bit-flips that can be used to issue an indication that the corrupted data suffers from a multiple bit-flip. In a third example, and in one embodiment, Table 6 shows that the each of the following predetermined six-bit words formed from the six syndrome bits (also referred to $S_{5-0}$) indicates that a single bit-flip affecting the 16 data bits has been detected and corrected: 010011; 010101; 010110; 011001; 011010; 011100; 011111; 101111; 110001; 110010; 110100; 110111; 111000; 111011; 111101; and 111110. In a fourth example, and in one embodiment, Table 6 shows that each of the following predetermined six-bit words formed from the six syndrome bits (also referred to $S_{5-0}$) indicates that a single bit-flip affecting the 6 read or write parity bits has been detected and ignored: 000001; 000010; 000100;

001000; 010000; and 100000. In a fifth example, and in one embodiment, Table 6 shows that each of the following predetermined six-bit words formed from the six syndrome bits (also referred to $S_{5-0}$) indicate that a multiple bit-flip affecting the 16 data bit and the 6 read or write parity bits was detected and can be used to issue an indication that the corrupted data suffers from a multiple bit-flip: 000011; 000101; 000110; 000111; 001001; 001010; 001011; 001100; 001101; 001110; 001111; 010001; 010010; 010100; 010111; 011000; 011011; 011101; 011110; 100001; 100010; 100011; 100100; 100101; 100110; 100111; 101000; 101001; 101010; 101011; 101100; 101101; 101110; 110000; 110011; 110101; 110110; 111001; 111010; 111100; and 111111. In a sixth example, and in one embodiment, Table 6 shows that, when the predetermined six-bit words formed from the six syndrome bits (also referred to $S_{5-0}$) is equal to 000000, then no error has been detected. It is to be appreciated that the predetermined six-bits words shown in the preceding five example are merely illustrative. The predetermined six-bit words can be assigned based on known techniques for creating words having a fixed length.

With regard again to FIG. 4, at decision block 427, the generated 6 syndrome bits, which are based on bitwise XOR operations of the 6 write parity bits generated from the 16 data bits encoded in the input signal 301 (also known as SQ_DI[15:0]) with the corresponding 6 read parity bits generated from the 16 data bits encoded in the output signal 319A (also referred to as NVM_DO[16:1]), are verified to determine whether any one of the 6 syndrome bits is equal to zero. In one embodiment, if decision block 427 detects that each one of the 6 syndrome is equal to zero, then the decision block 427 determines that no error has been detected, as shown in block 437. In one embodiment, the decision of block 437 is provided to the reader 105. The detection can be performed using one or more of the descriptions provided above in connection with at least one of FIG. 1, 2, 3, or 4.

In one embodiment, if the decision block 427 determines that any one of the 6 syndrome bits is not equal to zero, then the decision block 427 provides the 6 syndrome bits to a decision block 429. In one embodiment, the decision block 429 determines whether the error is a single bit-flip (single error syndrome) or a multiple bit-flip (multiple error syndrome). The detection can be performed using one or more of the descriptions provided above in connection with at least one of FIG. 1, 2, 3, or 4.

In one embodiment, at decision block 429, if it is determined that the six syndrome bits (also referred to $S_{5-0}$) form one of multiple predetermined six-bit words that are used to indicate a detection of a single bit-flip, then a decision is made that a single bit-flip has been detected, as shown in block 435. In one embodiment, the predetermined six-bits used to indicate a detection of a single bit-flip are 000001; 000010; 000100; 001000; 010000; 010011; 010101; 010110; 011001; 011010; 011100; 011111; 100000; 101111; 110001; 110010; 110100; 110111; 111000; 111011; 111101; and 111110.

In an alternate embodiment of block 429, if it is determined that the six syndrome bits (also referred to $S_{5-0}$) form one of multiple predetermined six-bit words that are used to indicate a detection of a multiple bit-flip, then a decision is made that a multiple bit-flip has been detected, as shown in block 433. For the sake of brevity, this alternate embodiment of block 429 is not shown in FIG. 4.

In one embodiment, the decision of block 435 is provided to the reader 105. In one embodiment, the detected single bit-flip can be corrected as described above in connection with descriptions of at least one of the pseudo-codes, tables, or the module 425.

In one embodiment, at decision block 429, if it is determined that more than one of the 6 parity bits is inflicted with a single bit-flip, then a decision is made that a multiple bit-flip has been detected, as shown in block 433. In one embodiment, the decision of block 433 is provided to the reader 105. The detection can be performed using one or more of the descriptions provided above in connection with at least one of FIG. 1, 2, 3, or 4.

Figure 5:
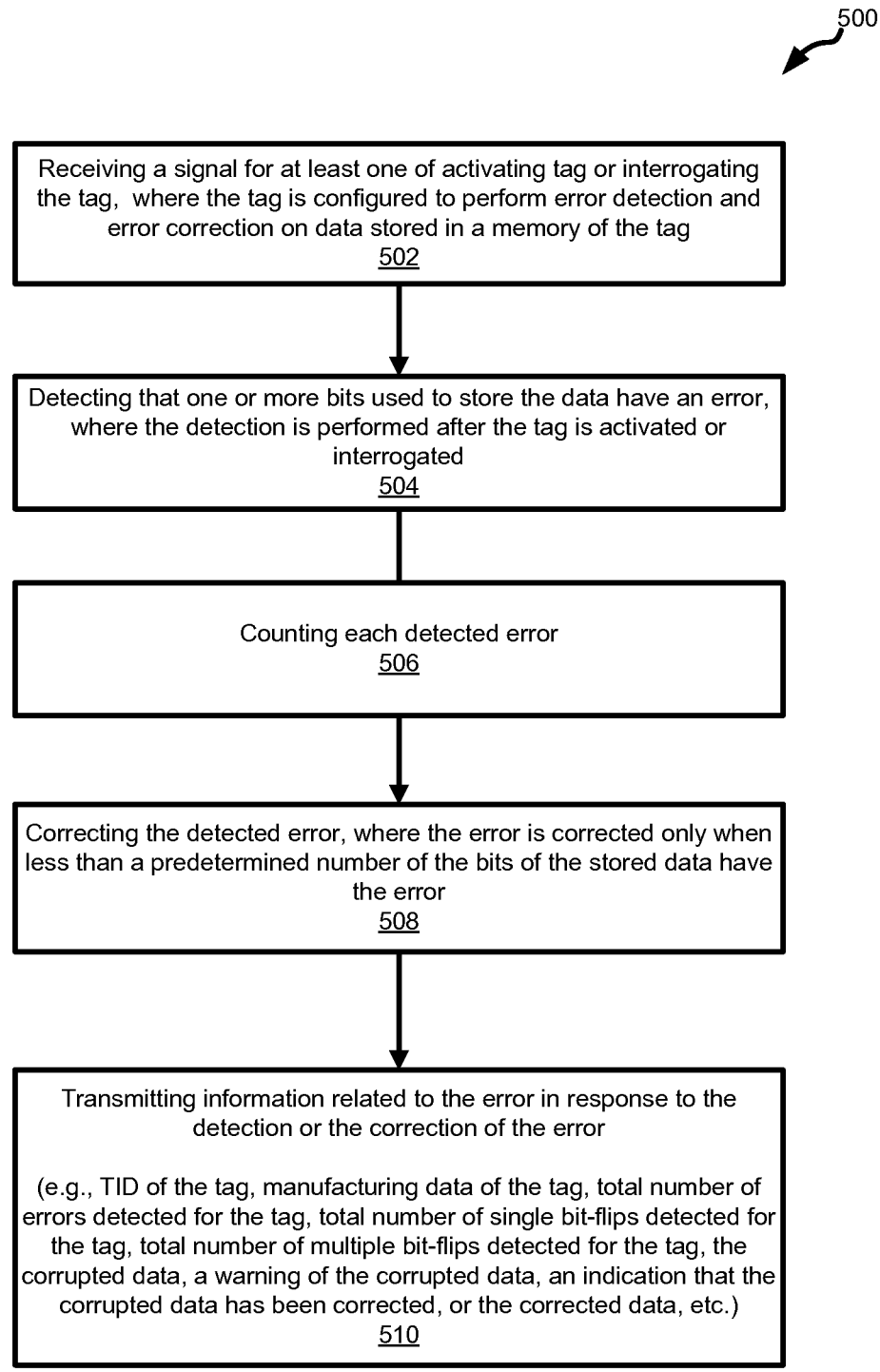
FIG. 5 is a flow diagram illustrating a process for at least one of error correction or error detection that includes a tag according to at least one of the embodiments described herein.

FIG. 5 is a flow diagram illustrating a process 500 for performing at least one of error correction or error detection on data obtained from the memory in a tag according to at least one of the embodiments described herein. In embodiment, process 500 is performed using at least one of the tags 101A-N described above in at least one of FIGS. 1-4.

Process 500 begins at block 502. In one embodiment, a tag performing process 500 receives a signal triggering at least one of an activation of the tag (if the tag is a passive or semi-passive tag) or an interrogation of the tag (if the tags is a passive, semi-passive, or active tag). In one embodiment, the tag is activated in accordance with at least one of the descriptions provided in connection with at least one of FIGS. 1-4. In one embodiment, the tag is interrogated in accordance with at least one of the descriptions provided in connection with at least one of FIGS. 1-4. In one embodiment, the tag is activated as is known in the art. In one embodiment, the tag is interrogated as is known in the art. In one embodiment, the tag implementing process 500 is configured to perform at least one of error detection or error correction on data stored in a memory of the tag. In one embodiment, the performance of at least one of error detection or error correction is in accordance with at least one of the descriptions provided in connection with at least one of FIGS. 1-4.

In one embodiment, at block 504, the tag detects that one or more bits used to store the data in the memory of the tag have an error, where the detection is performed after the tag is activated or interrogated. In one embodiment, the tag implementing process 500 is configured to detect at least one of a single bit-flip or a multiple bit-flip on data stored in a memory of the tag. In one embodiment, the detection of a single bit-flip or a multiple bit-flip is in accordance with at least one of the descriptions provided in connection with at least one of FIGS. 1-4.

In one embodiment, at block 506, the tag counts each of the detected errors. In one embodiment, the counted errors are stored as a count in the memory of the tag. In one embodiment, the count includes at least one of the total number of detected errors for the tag, a total number of single bit-flips for the tag, or a total number of multiple bit-flips for the tag. In one embodiment, the count is continually updated. In one embodiment, the tag implementing process 500 is configured to count the detected errors in accordance with at least one of the descriptions provided in connection with at least one of FIGS. 1-4.

In one embodiment, at block 508, the tag corrects the detected error. In one embodiment, the detected error is corrected only when less than a predetermined number of the bits of the stored data have the error. In one embodiment, the tag implementing process 500 is configured to correct the detected errors in accordance with at least one of the descriptions provided in connection with at least one of FIGS. 1-4.

In one embodiment, at block 510, the tag transmits at least one of the count, the corrupted data, a warning of the corrupted data, an indication that the corrupted data has been corrected, or the corrected data in response to the detection or the correction of the error. In one embodiment, the tag implementing process 500 is configured to transmit at least one of the count, the corrupted data, a warning of the corrupted data, an indication that the corrupted data has been corrected, or the corrected data in response to the detection or the correction of the error in accordance with at least one of the descriptions provided in connection with at least one of FIGS. 1-4.

Figure 6:
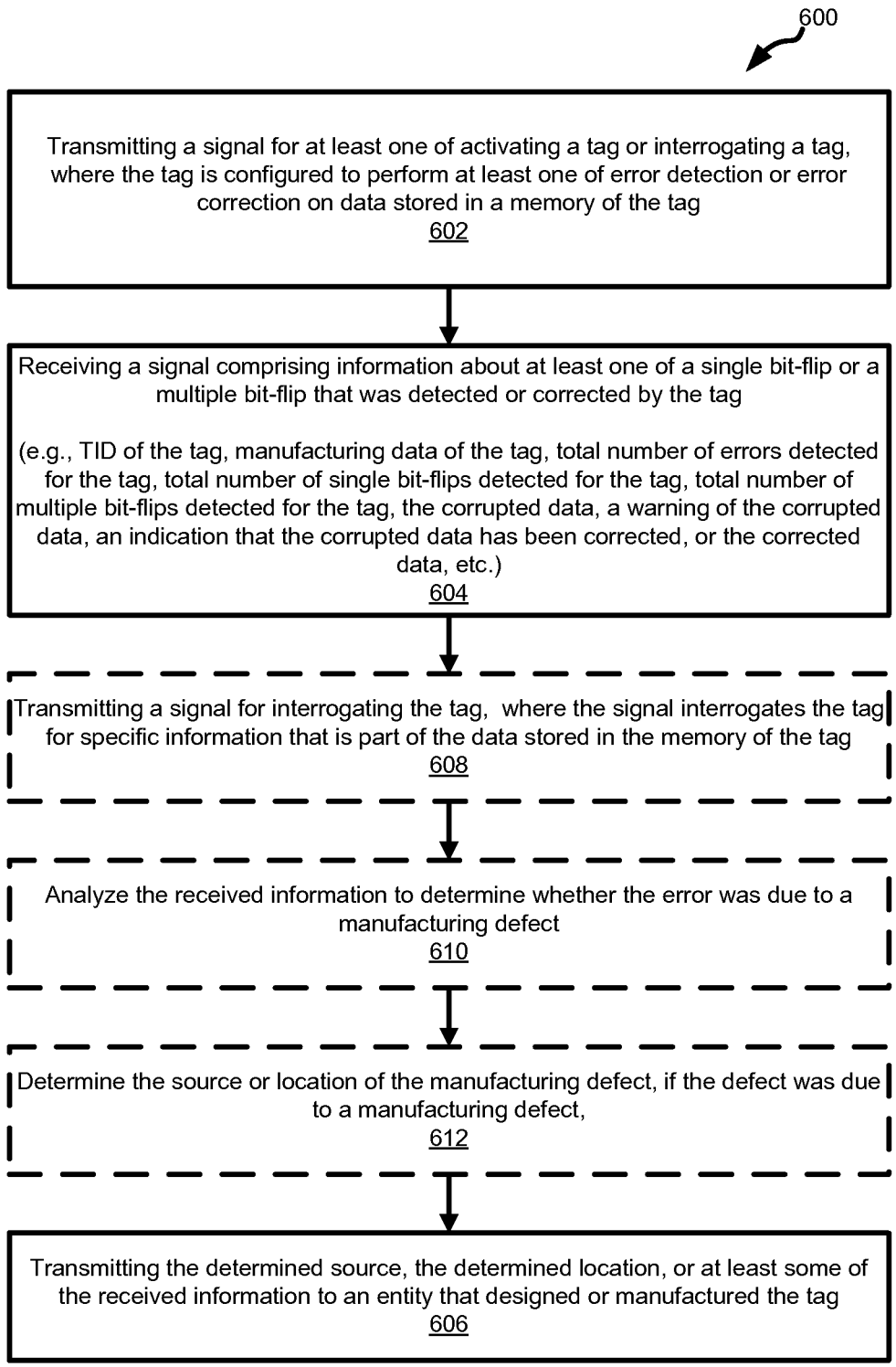
FIG. 6 is a flow diagram illustrating a process for at least one of error correction or error detection that includes a reader according to at least one of the embodiments described herein.

FIG. 6 is a flow diagram illustrating a process 600 for performing at least one of error correction or error detection that includes a reader according to at least one of the embodiments described herein. In one embodiment, process 600 is performed using the reader 105 described above in at least one of FIGS. 1-4.

Process 600 begins at block 602. In one embodiment, a reader performing process 600 transmits a signal triggering at least one of an activation of the tag (if the tag is a passive or semi-passive tag) or an interrogation of the tag (if the tags is a passive, semi-passive, or active tag). In one embodiment, the tag is activated in accordance with at least one of the descriptions provided in connection with at least one of FIGS. 1-4. In one embodiment, the tag is interrogated in accordance with at least one of the descriptions provided in connection with at least one of FIGS. 1-4. In one embodiment, the tag is activated as is known in the art. In one embodiment, the tag is interrogated as is known in the art. In one embodiment, the tag that is activated or interrogated by the reader implementing process 600 is configured to perform at least one of error detection or error correction on data stored in a memory of the tag. In one embodiment, the performance of at least one of error detection or error correction is in accordance with at least one of the descriptions provided in connection with at least one of FIGS. 1-5.

In one embodiment, at block 604, the reader receives a signal comprising information about at least one of a single bit-flip or a multiple bit-flip that was detected or corrected by the tag. In one embodiment, the signal is sent by the tag. In one embodiment, the signal also includes at least one of a TID of the tag, manufacturing data of the tag, total number of errors detected for the tag, total number of single bit-flips detected for the tag, total number of multiple bit-flips detected for the tag, the corrupted data, a warning of the corrupted data, an indication that the corrupted data has been corrected, or the corrected data, etc. In one embodiment, the reader implementing process 600 is configured to receive the information from the tag in accordance with at least one of the descriptions provided in connection with at least one of FIGS. 1-4.

In one embodiment, at block 606, the reader transmits at least some of the received information to an entity that designed or manufactured the tag. In one embodiment, the received information is transmitted to a computer system or processing device associated with the entity using a network and/or a network interface. In one embodiment, the reader implementing process 600 is configured to transmit at least some of the information received from the tag to the designing or manufacturing entity in accordance with at least one of the descriptions provided in connection with at least one of FIGS. 1-4.

In one embodiment, at optional block 608, the reader can optionally transmit a signal to the tag to interrogate the tag for specific information. For example, and in one embodiment, if the TID of the tag or the manufacturing data of the tag was not provided to the reader at block 604, then at block 608, the reader can send one or interrogation signals requesting at least one of the TID number or the manufacturing data. In one embodiment, a processing device within the reader is configured with a computer program that enables the reader to interrogate the tag for specific information. In one embodiment, at optional block 610, the reader can analyze the manufacturing data to determine if the error (e.g., a bit-flip) is a result of a manufacturing defect. In one embodiment, if the error (e.g., a bit-flip) is a result of a manufacturing defect, the reader can further analyze the manufacturing data to determine the source or location of the manufacturing detect, as shown in optional block 612. In this way, the error correction performed by the ICs of the tag is used as an indicator of the manufacturing robustness of the tag. This indication is a result of the tag providing information to the reader of FIG. 6 that includes the manufacturing data stored in the tag when any error (e.g., a bit-flip) in stored data (e.g., user data or manufacturing data) is detected.

Figure 7:
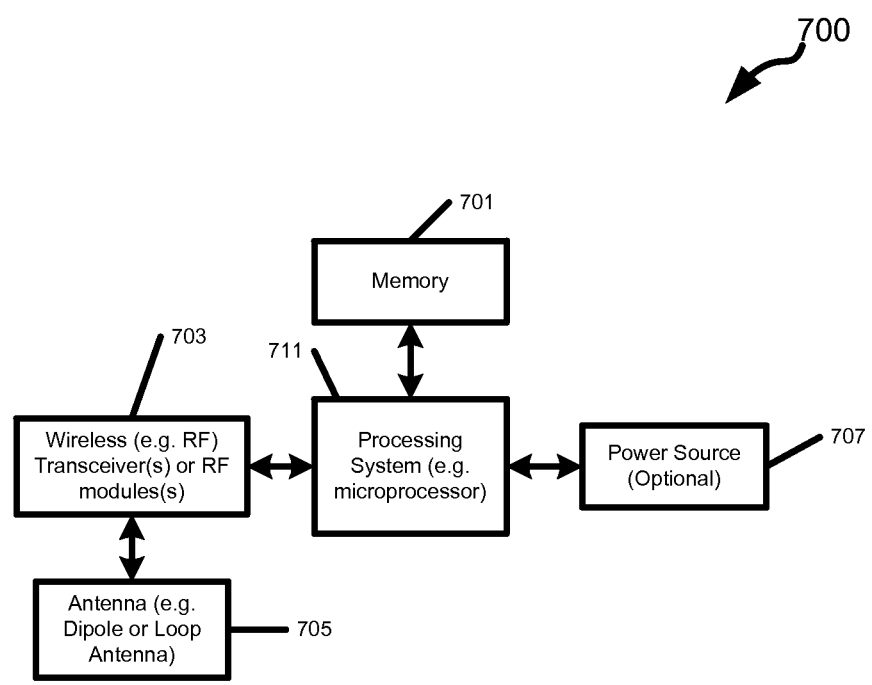
FIG. 7 shows an exemplary tag according to one or more of the embodiments described herein.

FIG. 7 illustrates an exemplary embodiment of a tag 700 according to one or more of the embodiments described herein. The exemplary tag 700 includes an antenna 705, receiver/transmitter 703, and a processing system 711 and an optional power source 707 (depending on if the tag is a passive, semi-passive, or active tag). The tag 700 is a data processing system. In one embodiment, the processing system 711 includes one or more microprocessors. In one embodiment, the processing system 711 may be a system-on-a-chip IC. In one embodiment, the tag 700 includes memory 701 for storing data and programs for execution by the processing system 711. In one embodiment, at least one of the methods and techniques described in connection with at least one of FIGS. 1-5 is embodied in a data or program that is stored on memory 703 and executed by the tag 700. In one embodiment, the memory 701 includes at least one of non-volatile memory or volatile memory. In one embodiment, the memory 701 includes only non-volatile memory.

The tag 700 also includes one or more wireless transceivers 703 or RF modules 703 to communicate with another data processing system. A wireless transceiver may be a RF transceiver for an active RFID network. RF modules are defined above in connection with FIG. 2. An antenna system 705 may be coupled with the wireless transceiver(s)/RF module(s) 703. Additionally, the tag 700 may optionally include a power source 707. The power source may be a built-in battery or a replaceable battery. In one embodiment, the power source 707 may be based on solar energy source or driven by an external energy source. It will be appreciated that additional components, not shown, may also be part of the tag 700 in at least one of the embodiments described herein. Furthermore, it will be appreciated that in at least one of the embodiments described herein, fewer components than shown in FIG. 7 may also be used in the data processing system 700.

Figure 8:
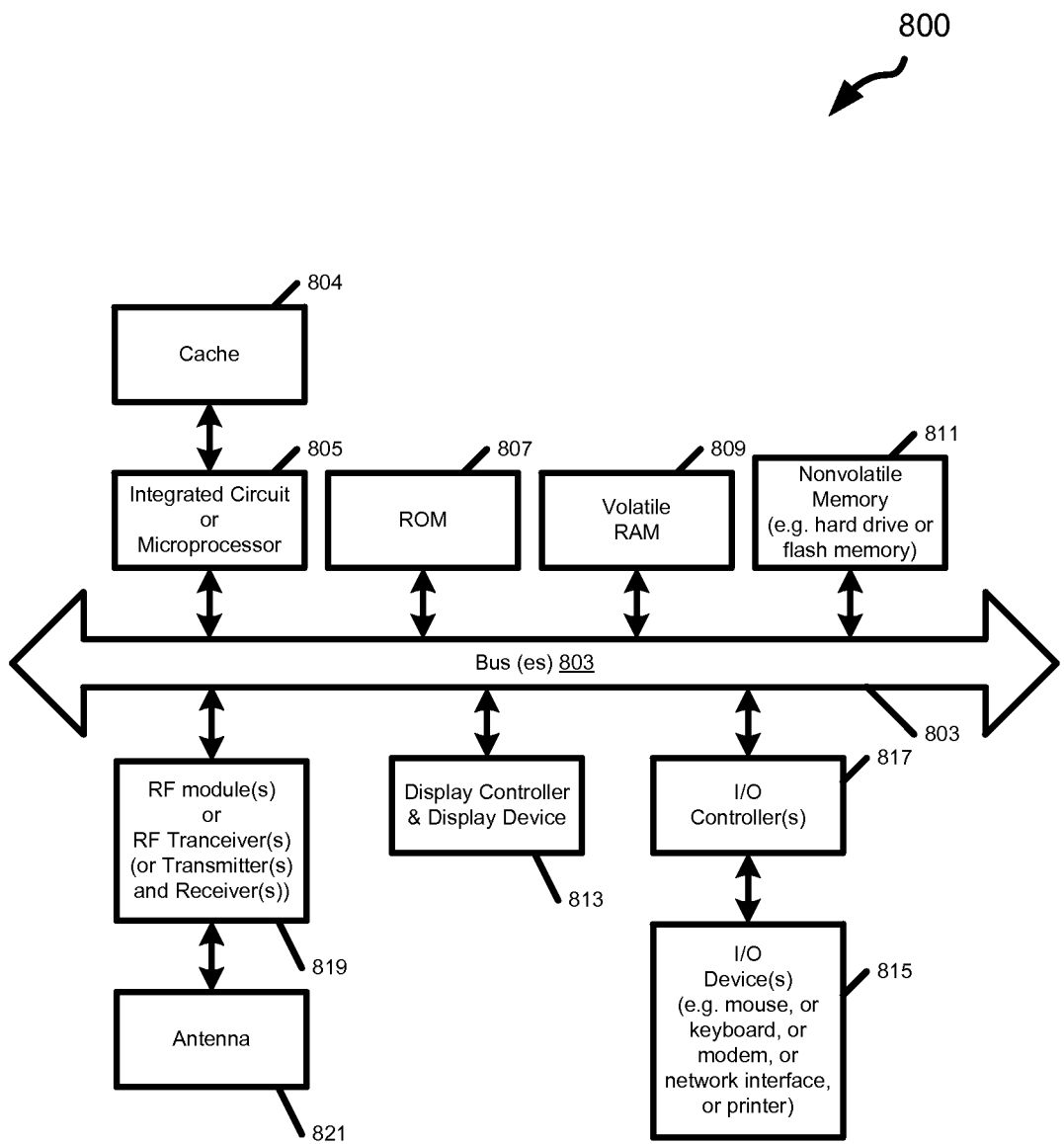
FIG. 8 shows an exemplary reader according to one or more of the embodiments described herein.

FIG. 8 shows an exemplary reader 800 according to another one of the embodiments described herein. The reader 800 is an example of a data processing system that may be used with one or more of the embodiments described herein. For example, the reader 800 may be implemented as a part of the systems shown in FIG. 1. Note that while FIG. 8 illustrates various components of a computer system, it is not intended to represent any particular architecture or manner of interconnecting the components as such details are not germane to the embodiments described herein. It will also be appreciated that network computers and other data processing systems which have fewer components or perhaps more components may also be used with the embodiments described herein.

As shown in FIG. 8, the reader 800, which is a form of a data processing system, includes a bus 803 that is coupled to an IC 805 or a microprocessor(s) 805, a ROM (Read Only Memory) 807, volatile RAM 809, and a non-volatile memory 811. The IC/microprocessor 803 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices 815 which may be mice, keyboards, modems, network interfaces, printers and other devices, which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

Additionally, one or more wireless transceiver(s)/RF module(s) 819 may be coupled with bus 803 to provide an interface to a wireless network. The wireless transceiver 819 may be a radio frequency (RF) transceiver (e.g., an RF transceiver for an RFID wireless network) or a Wi-Fi transceiver for IEEE 802 based wireless network. Transceiver 819 may be coupled with an antenna system 821. RF modules are described above in connection with FIG. 2.

The mass storage 811 is typically a magnetic hard drive or a magnetic optical drive or an optical drive or a DVD RAM or a flash memory or other types of memory systems which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the embodiments described herein may utilize a non-volatile memory which is remote from the system, such as a network storage device which is coupled to the data processing system through a network interface such as a modem or Ethernet interface or wireless networking interface. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

At least one of the embodiments described herein also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, the embodiments described herein are not described with reference to any particular programming language. It will be appreciated that a variety of programming languages may be used to implement the teachings of the embodiments described herein.

The foregoing discussion merely sets forth some examples of the embodiments described herein. One skilled in the art will readily recognize from such discussion, the accompanying drawings, and the claims that various modifications can be made without departing from the spirit and scope of the embodiments described herein.

What is claimed is:

1. An error correction method for use with a radio frequency identification (RFID) tag comprised of an antenna and an integrated circuit (IC), the method comprising:
receiving, via the antenna, a signal for at least one of activating the tag or interrogating the tag, wherein the IC comprises memory storing data associated with the tag, wherein the stored data includes manufacturing data unique to the tag and related to the manufacturing of the tag, and wherein the IC is configured to perform at least one of error detection or error correction on at least some of the stored data, wherein the manufacturing data is to determine if a detected or corrected error is a result of a manufacturing defect to the tag or the source or location of the manufacturing defect;
detecting, by the IC, that one or more bits of the stored data has an error after the tag is activated; and
transmitting the manufacturing data in response to one or more bits of the stored data being detected with an error.

2. The error correction method of claim 1, wherein the manufacturing data comprises at least one of:
a wafer number,
a manufacturer of the tag,
a wafer lot number,
a manufacturing process of a wafer comprising a die of the IC, or
a location of the die on the wafer.

3. The error correction method of claim 1, further comprising:
correcting, by the IC, the detected error, wherein the error is corrected only when less than a predetermined number of the bits of the stored data have the error and wherein the manufacturing data is transmitted after the correction is performed.

4. The error correction method of claim 3, wherein the predetermined number is less than or equal to three and is small relative to a total number of the bits of the stored data.

5. The error correction method of claim 4, wherein the ratio of the predetermined number to total number of the bits is 1:16 or 2:16.

6. The error correction method of claim 1, wherein the IC of the tag further comprises an error counter configured to count each error that occurs with the bits of the stored data, wherein a count having the total number of occurred errors is stored in the memory, wherein the count is continually updated, and wherein a signal including the count is transmitted via the antenna each time an error is detected and the count is updated.

7. The error detection method of claim 1, wherein the memory is a non-volatile memory and wherein the stored data includes user data that is programmed into the non-volatile memory.

8. The error detection method of claim 1, wherein the manufacturing data is transmitted to at least one of an RFID reader or an entity that designed or manufactured the tag.

9. An error correction method for use with a radio frequency identification (RFID) reader, the method comprising:
transmitting, by the reader, a signal for at least one of activating a tag or interrogating the tag, wherein the tag comprises an antenna and an integrated circuit (IC), wherein the IC comprises non-volatile memory storing data associated with the tag, wherein the stored data includes manufacturing data unique to the tag and related to the manufacturing of the tag, wherein the IC is configured to perform at least one of error detection or error correction on at least some of the stored data and wherein the manufacturing data is to determine if a detected or corrected error is a result of a manufacturing defect to the tag or the source or location of the manufacturing defect;
receiving, by the reader, a signal comprising information about at least one error that was detected or corrected by the IC of the tag, wherein the detected error affects one or more bits of the stored data;
transmitting, by the reader, a signal comprising the manufacturing data to an entity that designed or manufactured the tag.

10. The error correction method of claim 9, wherein the manufacturing data comprises at least one of:
a wafer number,
a manufacturer of the tag,
a wafer lot number,
a manufacturing process of a wafer comprising a die of the IC, or
a location of the die on the wafer; and
wherein the error is corrected only when less than a predetermined number of the bits of the stored data have the error; and
wherein the predetermined number is less than three and is small relative to a total number of the bits of the stored data.

11. The error correction method of claim 10, wherein the ratio of the predetermined number to total number of the bits is 1:16 or 2:16.

12. A radio frequency identification (RFID) system, the system comprising:
an RFID tag comprised of an antenna and an integrated circuit (IC), the IC comprising memory storing data associated with the tag, wherein the stored data includes manufacturing data unique to the tag and related to the manufacturing of the tag, and the IC being configured to perform at least one of error detection or error correction on at least some of the stored data, wherein the manufacturing data is to determine if a detected or corrected error is a result of a manufacturing defect to the tag or the source or location of the manufacturing defect, and
an RFID reader, wherein:
the reader is configured to transmit a first signal activating the tag;
the tag is configured to receive the first signal and become activated;
the tag is further configured to detect, after activation, that one or more bits of the stored data has an error;
the tag is further configured to transmit a second signal in response to one or more bits of the stored data being detected with an error, the second signal comprising the manufacturing data; and
the reader is further configured to receive the second signal transmitted by the tag.

13. The system of claim 12, wherein the tag is further configured to correct the detected error, wherein the error is corrected only when less than a predetermined number of the bits of the stored data have the error and wherein the manufacturing data is transmitted as part of the second signal after the correction is performed.

14. The system of claim 13, wherein the predetermined number is less than three and is small relative to a total number of the bits of the stored data and wherein the ratio of the predetermined number to total number of the bits is 1:16 or 2:16.

15. The system of claim 12, wherein the manufacturing data comprises at least one of:
   a wafer number,
   a manufacturer of the tag,
   a wafer lot number,
   a manufacturing process of a wafer comprising a die of the IC, or
   a location of the die on the wafer.

16. The system of claim 12, wherein the IC of the tag further comprises an error counter configured to count each error that occurs with the bits of the stored data, wherein a count having the total number of occurred errors is stored in the memory, wherein the count is continually updated, and wherein the second signal includes the count.

17. The system of claim 12, wherein the memory is a non-volatile memory and wherein the stored data includes user data that is programmed into the non-volatile memory.

18. The system of claim 12, wherein the reader is further configured to transmit the manufacturing data to an entity that designed or manufactured the tag.

19. A radio frequency identification (RFID) tag comprised of an antenna and an integrated circuit (IC), the tag comprising:
   a receiver configured to receive, via the antenna, a signal for at least one of activating the tag or interrogating the tag, wherein the IC comprises memory storing data associated with the tag, wherein the stored data includes manufacturing data unique to the tag and related to the manufacturing of the tag, wherein the IC is configured to perform at least one of error detection or error correction on the stored data and wherein the manufacturing data is to determine if a detected or corrected error is a result of a manufacturing defect to the tag or the source or location of the manufacturing defect;
   processing logic configured to detect that at least one of the bits of the stored data has an error, wherein the detection is performed after the tag is activated and wherein the processing logic is coupled to the receiver; and
   a transmitter configured to transmit the manufacturing data in response to at least one of the bits of stored data being detected with an error by the processing logic, wherein the transmitter is coupled to the processing logic.

20. The tag of claim 19, wherein the processing logic is further configured to correct the detected error, wherein the error is corrected only when less than a predetermined number of the bits of the stored data have the error and wherein the manufacturing data is transmitted after the correction is performed.

21. The tag of claim 19, wherein the manufacturing data comprises at least one of:
   a wafer number,
   a manufacturer of the tag,
   a wafer lot number,
   a manufacturing process of a wafer comprising a die of the IC, or
   a location of the die on the wafer.

22. The tag of claim 19, wherein the memory is a non-volatile memory and wherein the stored data includes user data that is programmed into the non-volatile memory.

23. A radio frequency identification (RFID) reader, the reader comprising:
   a transmitter configured to transmit a signal activating a tag, wherein the tag comprises an antenna and an integrated circuit (IC), wherein the IC comprises memory storing data associated with the tag, wherein the stored data includes manufacturing data unique to the tag and related to the manufacturing of the tag, and wherein the IC is configured to perform at least one of error detection or error correction on the stored data, wherein the manufacturing data is to determine if a detected or corrected error is a result of a manufacturing defect to the tag or the source or location of the manufacturing defect;
   a receiver configured to receive a signal comprising information about at least one error that was detected or corrected by the IC of the tag, wherein the at least one error affects one or more bits of the stored data and wherein the signal includes the manufacturing data;
   a processing system coupled to the transmitter and to the receiver;
   a network interface configured to transmit a signal comprising the manufacturing data to an entity that designed or manufactured the tag, wherein the network interface is coupled to the processing system.

24. The reader of claim 23, wherein the manufacturing data comprises at least one of:
   a wafer number,
   a manufacturer of the tag,
   a wafer lot number,
   a manufacturing process of a wafer comprising a die of the IC, or
   a location of the die on the wafer.

25. The reader of claim 23, wherein the network interface comprises at least one of:
   a Wi-Fi transceiver, an Ethernet transceiver, a cellular telephone transceiver, or a wireless personal area transceiver.

26. The reader of claim 23, wherein the memory is a non-volatile memory and wherein the stored data includes user data that is programmed into the non-volatile memory.

27. The reader of claim 23, wherein the processing system is configured to analyze the manufacturing data to determine whether the at least one error is due to a manufacturing defect.

28. The reader of claim 27, wherein the processing system is further configured to determine, when the at least one error is due the manufacturing defect, a source or a location of the manufacturing defect.

29. The reader of claim 28, wherein the signal transmitted by the network interface further includes the source or the location of the manufacturing defect.

* * * * *